(12) United States Patent
Utoh

(10) Patent No.: US 9,961,224 B2
(45) Date of Patent: May 1, 2018

(54) INFORMATION PROCESSING APPARATUS, CONTROL METHOD, AND RECORDING MEDIUM

(71) Applicant: Yohsuke Utoh, Kanagawa (JP)

(72) Inventor: Yohsuke Utoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 81 days.

(21) Appl. No.: 15/042,375

(22) Filed: Feb. 12, 2016

(65) Prior Publication Data

US 2016/0241732 A1 Aug. 18, 2016

(30) Foreign Application Priority Data

Feb. 16, 2015 (JP) .................................. 2015-027291
Feb. 1, 2016 (JP) .................................. 2016-017131

(51) Int. Cl.
G06F 3/12 (2006.01)
H04N 1/00 (2006.01)
G06K 9/00 (2006.01)

(52) U.S. Cl.
CPC ..... *H04N 1/00896* (2013.01); *G06K 9/00369* (2013.01); *H04N 1/00891* (2013.01); *H04N 2201/0094* (2013.01)

(58) Field of Classification Search
None
See application file for complete search history.

(56) References Cited

U.S. PATENT DOCUMENTS

| 2003/0089839 | A1* | 5/2003 | Butikofer | G05B 19/042 |
| | | | | 250/208.1 |
| 2010/0150600 | A1* | 6/2010 | Oyoshi | G03G 15/5004 |
| | | | | 399/88 |
| 2012/0138677 | A1* | 6/2012 | Ma | G07F 19/207 |
| | | | | 235/379 |

FOREIGN PATENT DOCUMENTS

| JP | H06-148972 | 5/1994 |
| JP | 2013-230688 | 11/2013 |

* cited by examiner

Primary Examiner — Vincent Rudolph
Assistant Examiner — Michael Burleson
(74) Attorney, Agent, or Firm — Harness, Dickey & Pierce, P.L.C.

(57) ABSTRACT

An information processing apparatus includes a moving body detector configured to detect approach of a moving body within a range of a predetermined detection distance, a status controller configured to restore, upon detection of the approach of the moving body, the information processing apparatus to a predetermined electric energy mode, an operation detector configured to detect an operation of a user, a storage part configured to store history information indicating the approach of the moving body and history information indicating the operation of the user, a computing part configured to re-compute the predetermined detection distance based on a restoration time required for restoring the information processing apparatus to the predetermined electric energy mode, and the history information stored in the storage part, and a setting part configured to set the re-computed predetermined detection distance in the moving body detector.

18 Claims, 19 Drawing Sheets

FIG.5

HISTORY INFORMATION

| SERIAL NUMBER | ITEM | DATE AND TIME |
|---|---|---|
| 1 | PRESENCE OF A PERSON DETECTED | 10:20:10 DEC-11 |
| 2 | OPERATIONS PART OPERATED | 10:20:13 DEC-11 |
| 3 | ABSENCE OF A PERSON DETECTED | 10:22:11 DEC-11 |
| 4 | PRESENCE OF PERSON DETECTED | 10:35:40 DEC-11 |
| 5 | ABSENCE OF A PERSON DETECTED | 10:35:43 DEC-11 |
| 6 | PRESENCE OF A PERSON DETECTED | 10:40:10 DEC-11 |
| 7 | ABSENCE OF A PERSON DETECTED | 10:50:40 DEC-11 |
| 8 | PRESENCE OF A PERSON DETECTED | 11:05:10 DEC-11 |
| 9 | ABSENCE OF A PERSON DETECTED | 11:05:15 DEC-11 |
| 10 | PRESENCE OF A PERSON DETECTED | 11:15:00 DEC-11 |
| 11 | OPERATIONS PART OPERATED | 11:15:05 DEC-11 |
| 12 | ABSENCE OF A PERSON DETECTED | 11:15:25 DEC-11 |
| 13 | PRESENCE OF A PERSON DETECTED | 11:45:00 DEC-11 |
| 14 | OPERATIONS PART OPERATED | 11:45:01 DEC-11 |
| 15 | ABSENCE OF A PERSON DETECTED | 11:46:30 DEC-11 |

⋮

| SERIAL NUMBER | ITEM | DATE AND TIME | 144i ... |
|---|---|---|---|
| 1 | MOVING BODY DETECTED (PRESENCE OF MOVING BODY) | 20xx. DEC-11 10:20:10 | ... |
| 2 | OPERATION DETECTED | 20xx. DEC-11 10:20:13 | ... |
| 3 | MOVING BODY DETECTED (ABSENCE OF MOVING BODY) | 20xx. DEC-11 10:22:11 | ... |
| 4 | MOVING BODY DETECTED (PRESENCE OF MOVING BODY) | 20xx. DEC-11 10:35:40 | ... |
| 5 | MOVING BODY DETECTED (ABSENCE OF MOVING BODY) | 20xx. DEC-11 10:35:43 | ... |
| 6 | MOVING BODY DETECTED (PRESENCE OF MOVING BODY) | 20xx. DEC-11 10:40:10 | ... |
| 7 | OPERATION DETECTED | 20xx. DEC-11 10:40:13 | ... |
| 8 | MOVING BODY DETECTED (ABSENCE OF MOVING BODY) | 20xx. DEC-11 10:40:35 | ... |
| 9 | MOVING BODY DETECTED (PRESENCE OF MOVING BODY) | 20xx. DEC-11 11:05:15 | ... |
| 10 | OPERATION DETECTED | 20xx. DEC-11 11:05:20 | ... |
| 11 | MOVING BODY DETECTED (ABSENCE OF MOVING BODY) | 20xx. DEC-11 11:05:58 | ... |
| 12 | MOVING BODY DETECTED (PRESENCE OF MOVING BODY) | 20xx. DEC-11 11:15:00 | ... |
| 13 | MOVING BODY DETECTED (ABSENCE OF MOVING BODY) | 20xx. DEC-11 11:15:05 | ... |
| ... | ... | ... | |

FIG.15A

| SERIAL NUMBER | ITEM | DATE AND TIME |
|---|---|---|
| 1 | MOVING BODY DETECTED (PRESENCE OF MOVING BODY) | 20xx. DEC-11 10:20:10 |
| 2 | ELECTRIC ENERGY MODE SWITCHED (OPERABLE) | 20xx. DEC-11 10:20:11 |
| 3 | IC CARD AUTHENTICATED (OK) | 20xx. DEC-11 10:20:15 |
| 4 | ELECTRIC ENERGY MODE SWITCHED (NORMAL) | 20xx. DEC-11 10:20:18 |
| 5 | OPERATIONS PART OPERATED (SETTING) | 20xx. DEC-11 10:20:22 |
| 6 | OPERATIONS PART OPERATED (SCANNING) | 20xx. DEC-11 10:20:28 |
| 7 | MOVING BODY DETECTED (ABSENCE OF MOVING BODY) | 20xx. DEC-11 10:22:11 |
| 8 | ELECTRIC ENERGY MODE SWITCHED (ENERGY-SAVING) | 20xx. DEC-11 10:22:41 |
| 9 | MOVING BODY DETECTED (PRESENCE OF MOVING BODY) | 20xx. DEC-11 10:25:10 |
| 10 | ELECTRIC ENERGY MODE SWITCHED (OPERABLE) | 20xx. DEC-11 10:20:11 |
| 11 | MOVING BODY DETECTED (ABSENCE OF MOVING BODY) | 20xx. DEC-11 10:25:13 |
| ... | ... | ... |

| CURRENT DETECTION AREA | RESTORATION TIME TO ALLOW OPERATIONS PANEL TO BE READY FOR USE | RESTORATION TIME TO BE READY TO START SCANNING | THRESHOLD FOR RE-COMPUTATION |
|---|---|---|---|
| 0.8 m | 1.5 s | 3 s | 40% |
| ... | ... | ... | ... |

| DETECTION AREA | | STANDARD ($\alpha = 1.0$) | ... |
|---|---|---|---|
| DETECTION-EXCLUDING PERIOD | START TIME | 12:00 | ... |
| | END TIME | 13:00 | ... |
| RESTORATION TIME SETTING | | OPERATIONS PANEL TO BE READY FOR USE | ... |

1443

INFORMATION PROCESSING APPARATUS, CONTROL METHOD, AND RECORDING MEDIUM

BACKGROUND OF THE INVENTION

1. Field of the Invention

The present invention relates to an information processing apparatus, a control method, and a recording medium storing a program.

2. Description of the Related Art

Image forming apparatuses such as multi-function printers or multi-function peripherals that are constantly turned on may need ways to reduce energy consumption. In view of operational efficiency, these image forming apparatuses may need to be ready immediately for use whenever users desire to use the image forming apparatuses.

In order to improve energy-saving performance and usability, Japanese Unexamined Patent Application Publication No. 2013-230688, for example, discloses a control technology to switch the unused image forming apparatus to an energy-saving mode, and restore the image forming apparatus from the energy-saving mode to a ready mode for use in advance, upon detecting, by a human body detector, a person approaching the image forming apparatus (see Patent Document 1). This technology enables the image forming apparatus to be in a ready mode to be ready for use whenever the users stand in front of the image forming apparatus.

The above-described control technology employing the human body detector has an important factor in setting a detection range (a detection distance). The related art control technology implemented in the human body detector may involve raising a threshold of detecting the presence of a human body when the unoperated image forming apparatus inefficiently repeats being restored from the energy-saving mode. This may interfere with setting a detection range appropriately. Too broad of a detection range may allow the human body detector to detect those who do not intend to use the image forming apparatus in addition to a user who desires to use the image forming apparatus to cause the image forming apparatus to be inefficiently restored from the energy-saving mode. On the other hand, too narrow detection range may prevent the image forming apparatus from being restored from the energy-saving mode when the user stands in front of the image forming apparatus.

The related art control technology to detect the user's approach may also be applied to various kinds of information processing apparatuses, which may have effects on the energy-saving performance and usability similar to those of the above-described image forming apparatuses.

RELATED ART DOCUMENT

Patent Document

Patent Document 1: Japanese Unexamined Patent Application Publication No. 2013-230688

SUMMARY OF THE INVENTION

Accordingly, it is a general object in one embodiment of the present invention to provide a technology capable of improving the energy-saving performance and the usability of the information processing apparatuses that substantially obviate one or more problems caused by the limitations and disadvantages of the related art.

According to an aspect of embodiments, there is provided an information processing apparatus that includes a moving body detector configured to detect approach of a moving body within a range of a predetermined detection distance; a status controller configured to restore, upon detection of the approach of the moving body, the information processing apparatus to a predetermined electric energy mode; an operation detector configured to detect an operation of a user; a storage part configured to store history information indicating the approach of the moving body and history information indicating the operation of the user; a computing part configured to re-compute the predetermined detection distance based on a restoration time required for restoring the information processing apparatus to the predetermined electric energy mode, and the history information stored in the storage part; and a setting part configured to set the re-computed predetermined detection distance in the moving body detector.

Other objects, features and advantages of the present invention will become more apparent from the following detailed description when read in conjunction with the accompanying drawings.

BRIEF DESCRIPTION OF THE DRAWINGS

FIG. 5 is a diagram illustrating an example of history information in the first embodiment;

FIGS. 15A and 15B are tables illustrating examples of history information in the second embodiment;

FIG. 16A is a table illustrating an example of apparatus-specific information, and FIG. 16B is a table illustrating an example of setting information in the second embodiment;

DETAILED DESCRIPTION OF THE PREFERRED EMBODIMENTS

The following describes embodiments and modifications with reference to the accompanying drawings.

Configuration

External View

Figure 1:
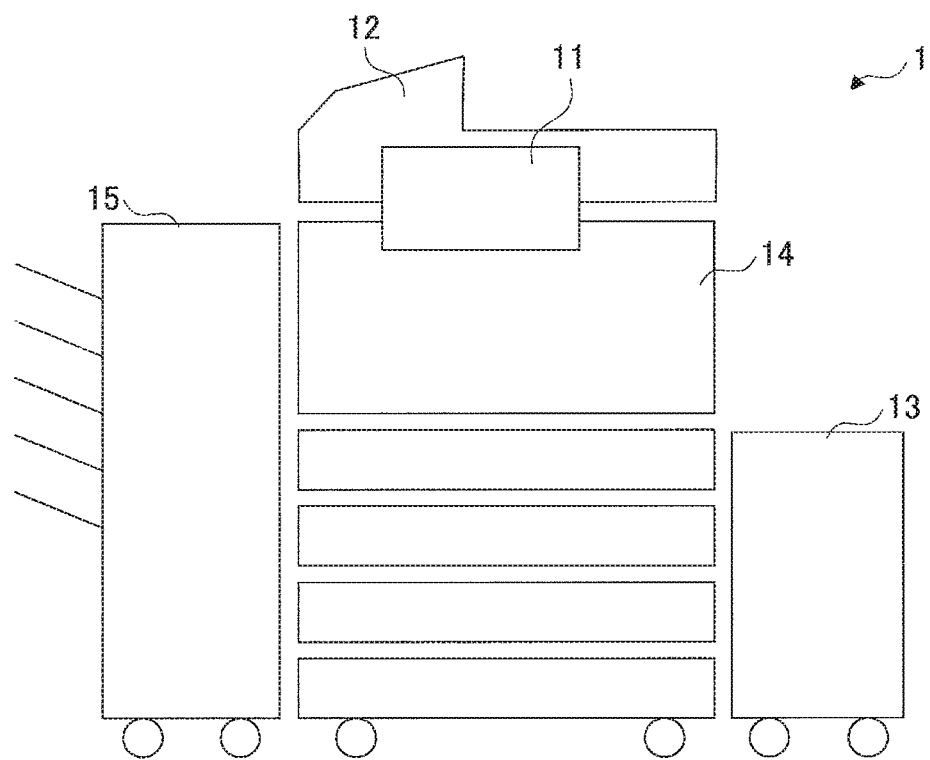
FIG. 1 is an external view illustrating a configuration example of an image forming apparatus according to an embodiment.

FIG. 1 is an external view illustrating a configuration example of an image forming apparatus 1. The image forming apparatus in FIG. 1 includes an operations part 11, a document reader 12, a sheet feeder 13, a printer part 14, and a sheet ejector 15.

The operations part 11 is configured to display a status of the image forming apparatus 1 and receive requests from users. The document reader 12 is configured to read original documents. The sheet feeder 13 is configured to supply sheets of paper subjected to printing. The printer part 14 is configured to perform printing based on the document read by the document reader 12 or the document given as data (data transmitted via a network or data obtained from a USB memory or the like). The sheet ejector 15 is configured to eject sheets of paper printed by the printer part 14.

First Embodiment

Figure 2:
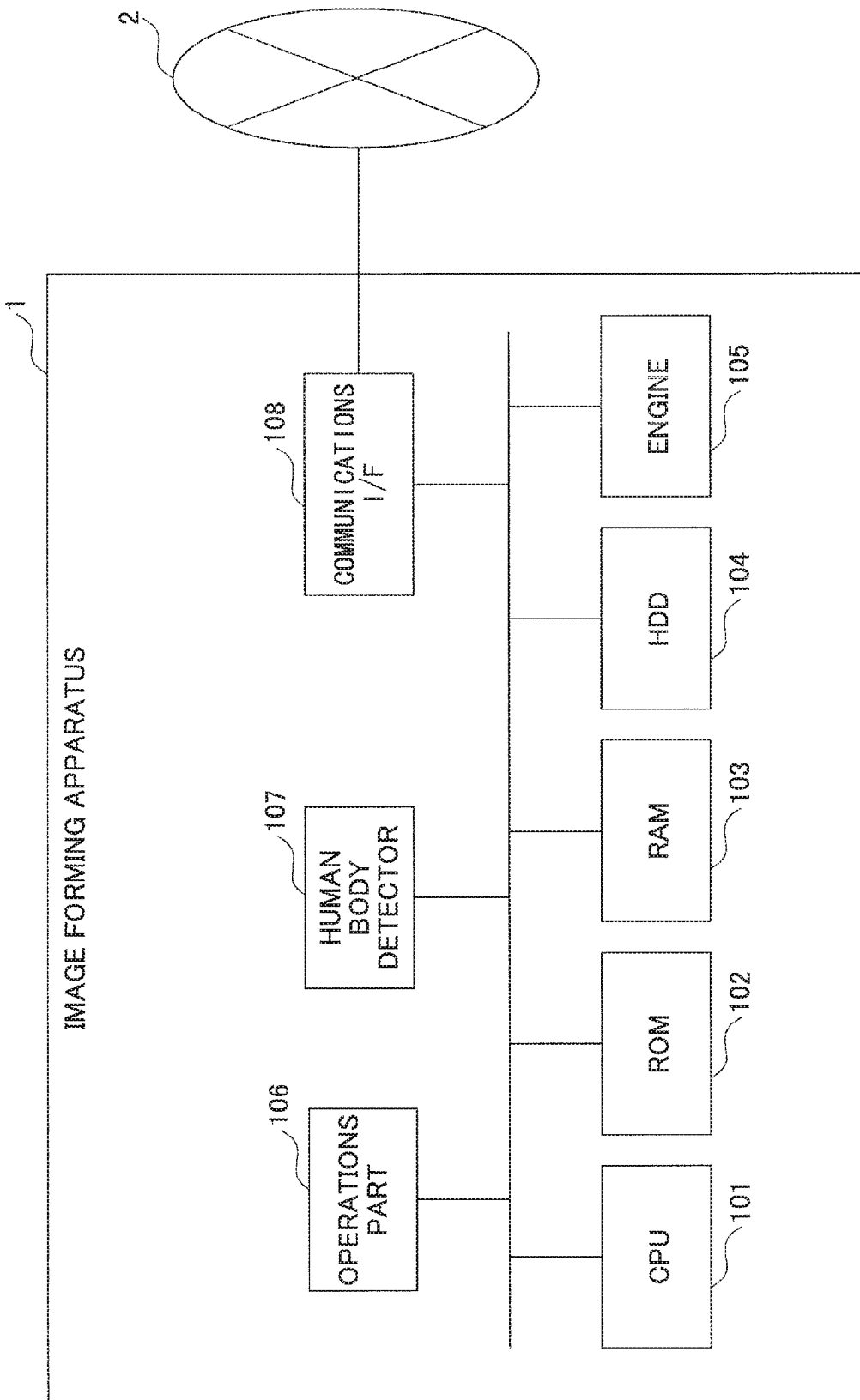
FIG. 2 is a diagram illustrating a hardware configuration example of the image forming apparatus according to a first embodiment.

FIG. 2 is a diagram illustrating a hardware configuration example of the image forming apparatus 1 according to the first embodiment. FIG. 2 illustrates the image forming apparatus 1 having a central processing unit (CPU) 101, a read only memory (ROM) 102, a random access memory (RAM) 103, a hard disk drive (HDD) 104, an engine part 105, an operations part 106, a human body detector 107, and a communications interface (communications I/F) 108.

The CPU 101 is configured to integrally controls the image forming apparatus 1. To control the image forming apparatus 1, the CPU 101 executes programs stored in the ROM 102 or HDD 104 using the RAM 103 as a work area. The engine part 105 serves as hardware to implement reading operations or printing operations, and is configured to implement various kinds of functions including a copier function, a scanner function, a facsimile function, and a printer function.

The operations part 106 serves as an interface configured to receive operations from users and report to the users a status of the image forming apparatus 1. The human body detector 107 is configured to detect a person approaching the image forming apparatus 1 or leaving from the image forming apparatus 1, and an example of the human body detector 107 may be a pyroelectric sensor. The communications I/F 108 serves as an interface configured to couple the image forming apparatus 1 to an external network 2.

Figure 3:
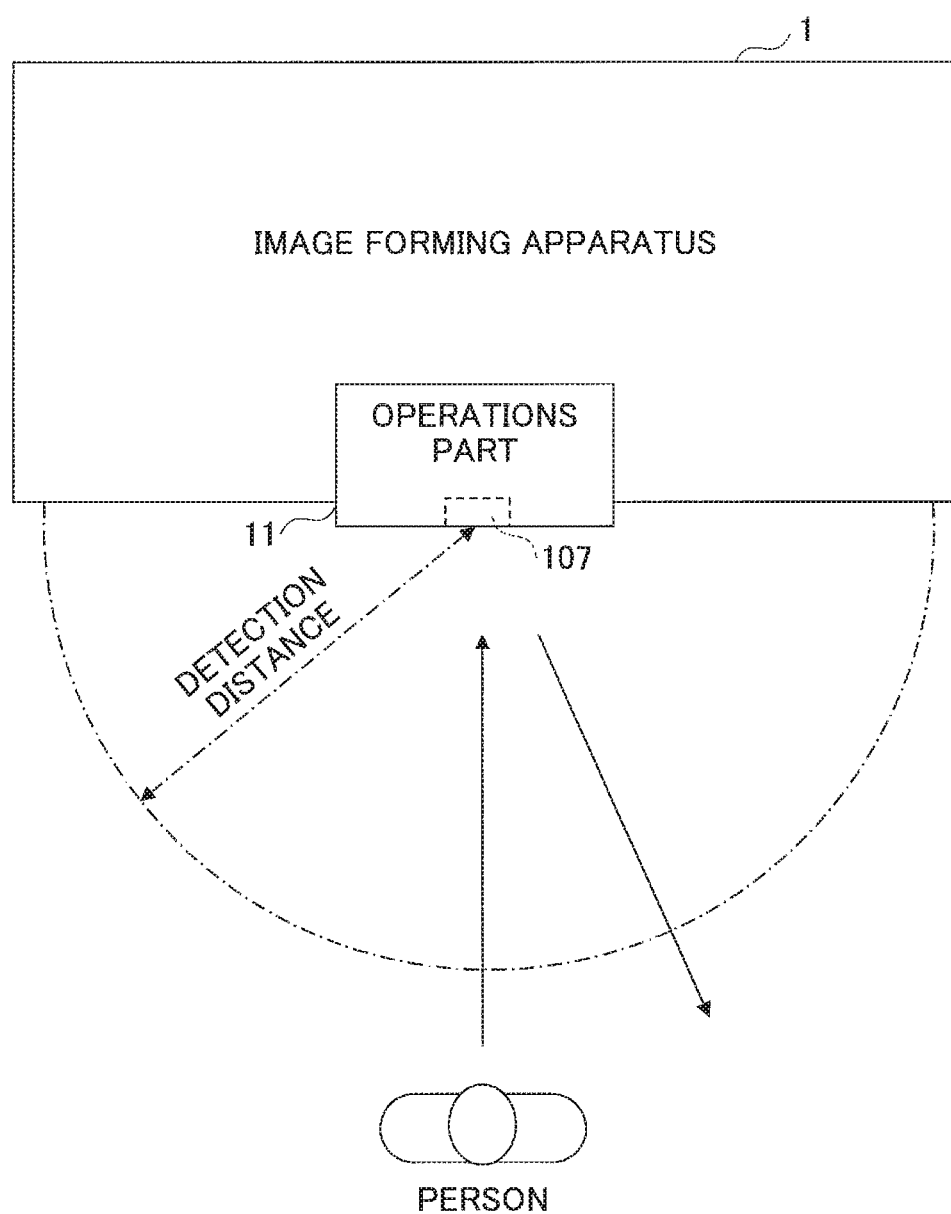
FIG. 3 is a diagram illustrating an example of a human body detector according to the first embodiment that detects a person approaching the image forming apparatus or leaving from the image forming apparatus.

FIG. 3 is a diagram illustrating an example of the human body detector 107 according to the first embodiment. The human body detector 107 is configured to detect a person approaching the image forming apparatus 1 or leaving from the image forming apparatus 1. More specifically, the human body detector 107 illustrated in FIG. 3 is disposed within the operations part 11 to detect a person approaching or leaving from an area having a radial of the detection distance from a position of the human body detector 107. Further, the human body detector 107 detects a person at a time at which the person enters and also detects a person at a time at which the person departs from the area. The detection distance is automatically set such that the image forming apparatus 1 may exhibit energy-saving performance and usability. Details of the detection distance will be described later.

Note that the arrangement of the human body detector 107 is not limited to the inside the operations part 11. The human body detector 107 may be disposed in a different part of the image forming apparatus 1, or may be disposed at a position distant from the image forming apparatus 1 that is connected to the human body detector 107 wirelessly or via wires. The area detected by the human body detector 107 is not limited to a non-directional circle. The area detected by the human body detector 107 may have a directional shape.

Figure 4:
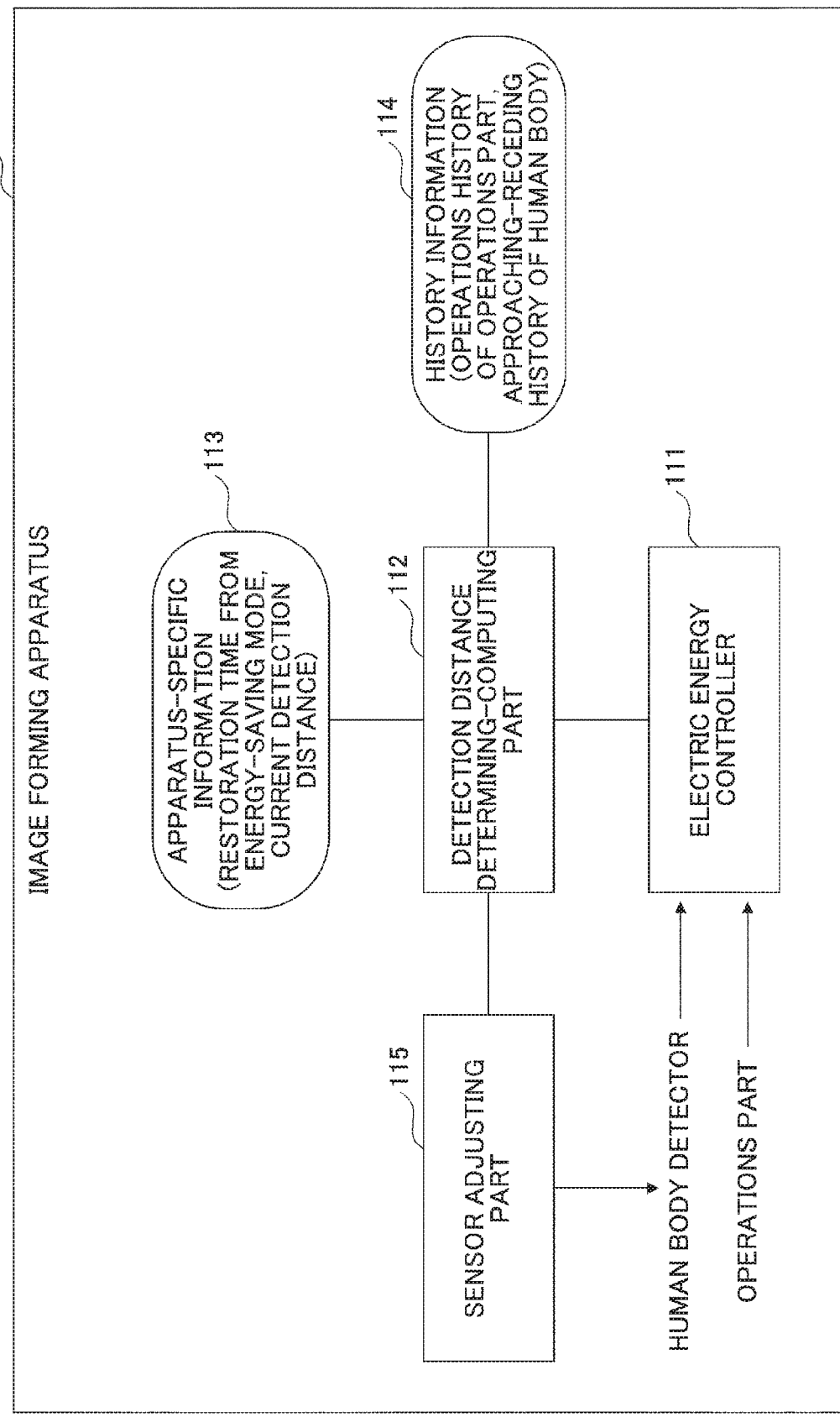
FIG. 4 is a diagram illustrating a software configuration example of the image forming apparatus according to the first embodiment.

FIG. 4 is a diagram illustrating a software configuration example of the image forming apparatus 1 according to the first embodiment. FIG. 4 illustrates the image forming apparatus 1 including an electric energy controller 111, a detection distance determining-computing part 112, and a sensor adjusting part 115. Apparatus-specific information 113 and history information 114 are referred to by and updated by the detection distance determining-computing part 112.

The apparatus-specific information 113 is held as information specific to (unique to) the image forming apparatus 1. More specifically, the apparatus-specific information 113 includes restoration time information indicating a time from an energy-saving mode of the operations parts 11 and 106 to an operable mode of the operations parts 11 and 106, and information about the current detection distance (i.e., the detection range or the detection area) of the human body detector 107.

The history information 114 includes history information of the operations parts 11 and 106, and history information of the human body detector 107. More specifically, the history information 114 includes records of the presence or absence of the detected person by the human body detector 107, and date and time at which the presence or absence of a person was detected, and records of date and time at which a user operated the operations part 106. Note that only the first one of operations performed by the operations part is recorded in the history immediately after a detected result of the presence of the person is recorded.

Referring back to FIG. 4, the electric energy controller 111 switches an electric energy mode of devices (e.g., the engine part 105, the HDD 104, the RAM 103, and the ROM 102) into a lower electric energy mode (a smaller electric consumption mode) when the image forming apparatus 1 is unused for a predetermined time, or when the electric energy controller 111 receives an instruction to switch the devices into an energy-saving mode. The electric energy controller 111 receives a person's approaching report from the human body detector 107 or an operation report from the operations part 106 as a trigger (restoring trigger) to restore the electric energy mode of the devices from the energy-saving mode, and switches the electric energy mode of the devices into a higher electric energy mode (a larger electric consumption mode) (a predetermined electric energy mode). The electric energy controller 111 is implemented by a program operating, for example, on the CPU 101 illustrated in FIG. 2.

For example, the electric energy mode may be divided into three modes: a first electric energy mode (a normal mode) in which electric energy (large quantity) is supplied to all the devices; a second electric energy mode (a first energy-saving mode) in which electric energy (intermediate quantity) is supplied to those devices operable by the operations part 106; and a third electric energy mode (a second energy-saving mode) in which electric energy (intermediate quantity) is supplied to those devices that are allowed to receive detection operations of the human body detector 107 and operations of the operations part 106. The electric energy controller 111 switches the electric energy mode between the first electric energy mode, the second electric energy mode, and the third electric energy mode, according to the length of the unused time of the image forming apparatus 1. The electric energy controller 111 also switches the electric energy mode from the third electric energy mode to the second electric energy mode, upon receiving the restoring trigger. The electric energy controller 111 switches the electric energy mode from the second electric energy mode to the first electric energy mode, according to content of the operation.

The detection distance determining-computing part (detection distance computing part) 112 manages the apparatus-specific information 113 and the history information 114 by storing the apparatus-specific information 113 and the history information 114 in the HDD 104 or the like illustrated in FIG. 2. The detection distance determining-computing part 112 determines whether to change the detection distance of the human body detector 107 at predetermined timing, and re-computes the detection distance when determined to change the detection distance. The detection distance determining-computing part 112 is implemented by a program operating, for example, on the CPU 101 illustrated in FIG. 2.

The sensor adjusting part 115 sets the detection distance computed by the detection distance determining-computing part 112 in the human body detector 107. The sensor adjusting part 115 is implemented by a program operating, for example, on the CPU 101 illustrated in FIG. 2.

Operations

Figure 6:
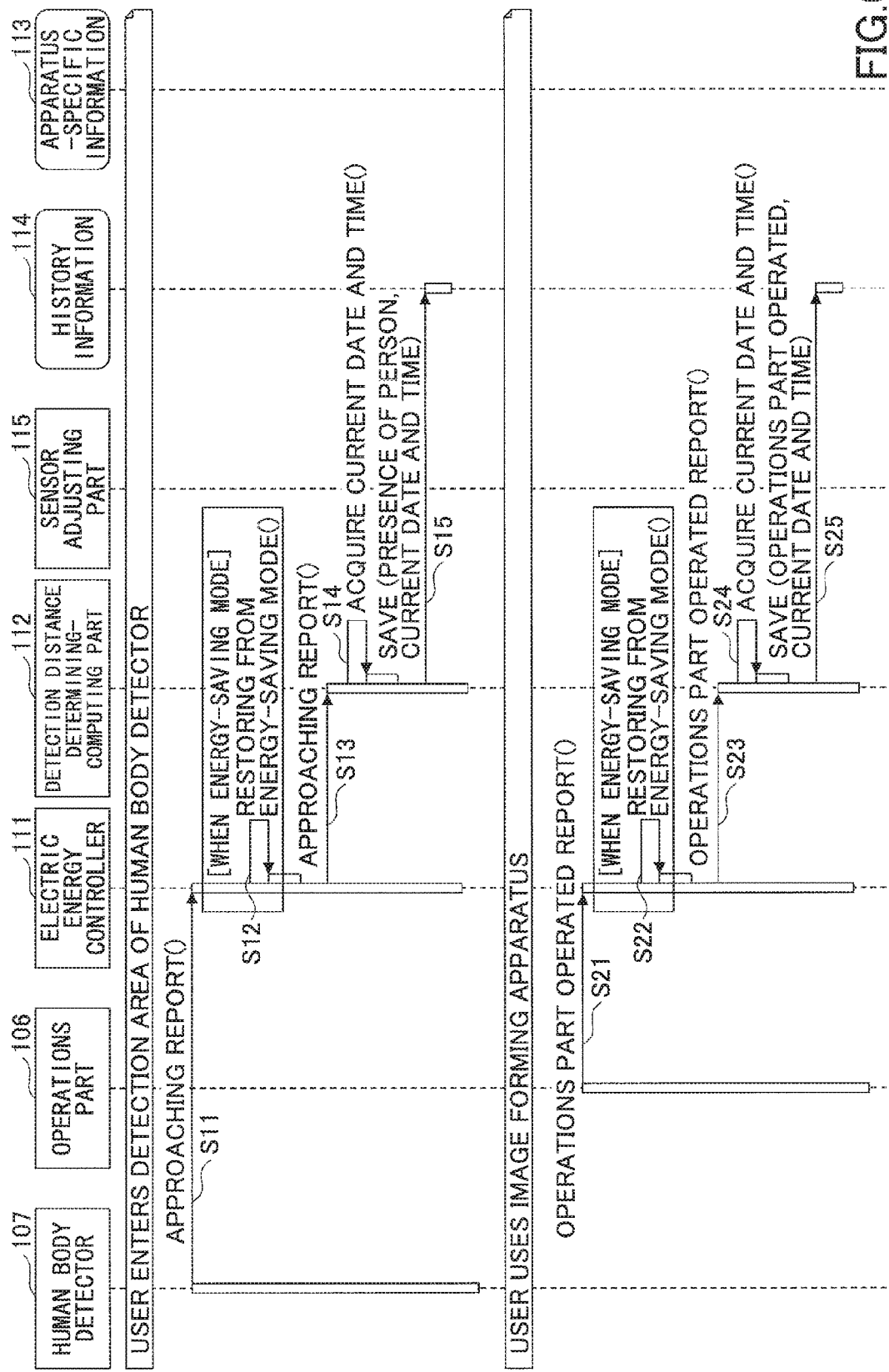
FIG. 6 is a sequence diagram (1) illustrating a process example in the first embodiment.
Figure 7:
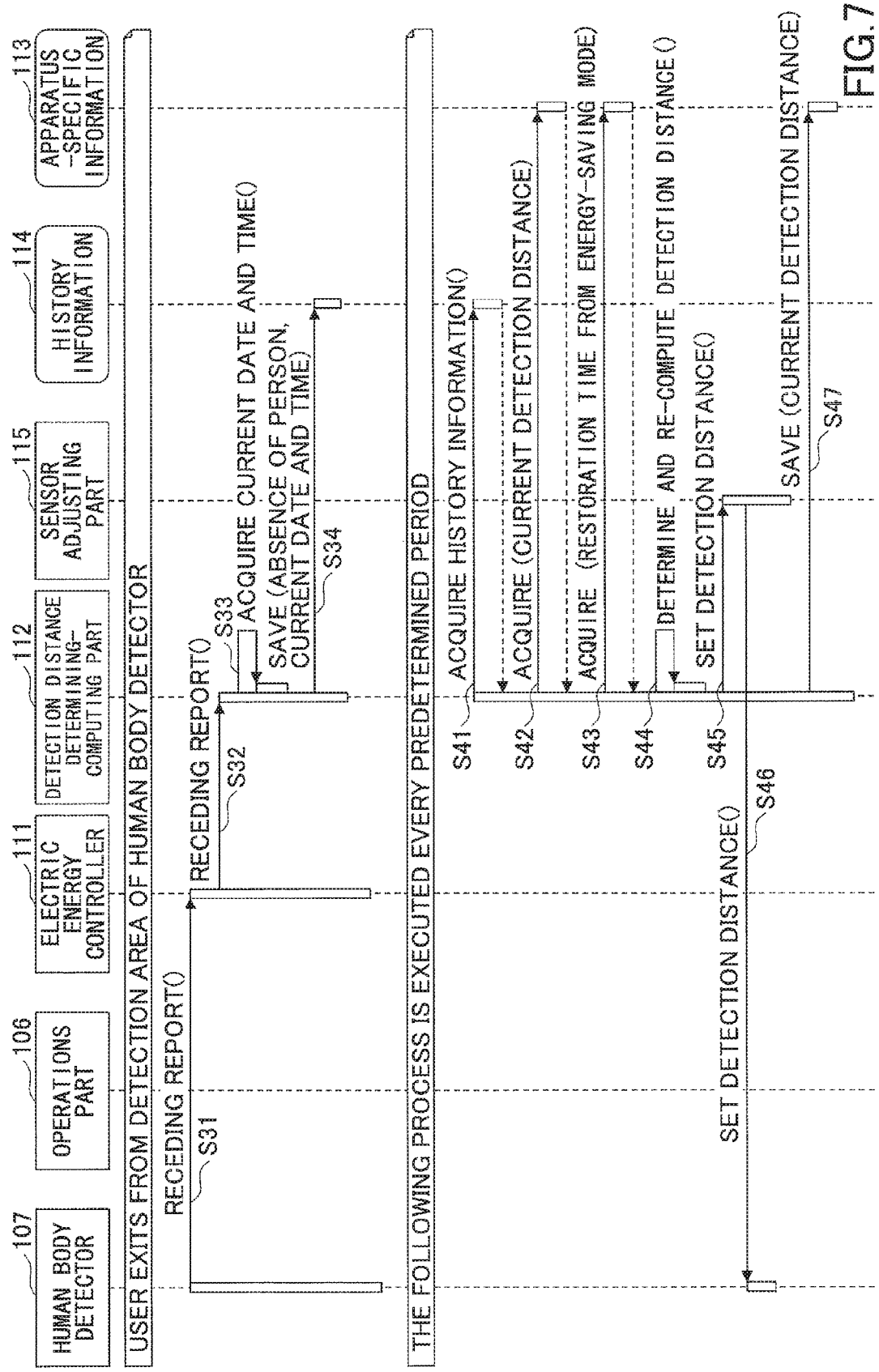
FIG. 7 is a sequence diagram (2) illustrating a process example in the first embodiment.

FIGS. 6 and 7 are sequence diagrams illustrating process examples of the first embodiment.

In FIG. 6, when a user enters a detection area of the human body detector 107, the human body detector 107 detects the person's approaching the image forming apparatus 1, and transmits an approaching report to the electric energy controller 111 (step S11). When the image forming apparatus 1 is in the energy-saving mode from which the image forming apparatus 1 needs to be restored by the user's approaching the image forming apparatus 1, the electric energy controller 111 restores the image forming apparatus 1 from the energy-saving mode (step S12). The electric energy controller 111 sends an approaching report to the detection distance determining-computing part 112 (step S13).

The detection distance determining-computing part 112 that has received the approaching report acquires current date and time (step S14), and saves a set of information "presence of a person: current date and time" to the history information 114 (step S15).

When the user uses the image forming apparatus 1, the operations part 106 transmits an operations part operation report to the electric energy controller 111 (step S21). When the image forming apparatus 1 is in the energy-saving mode from which the image forming apparatus 1 needs to be restored by the user's operations on the operations part, the electric energy controller 111 restores the image forming apparatus 1 from the energy-saving mode (step S22). The electric energy controller 111 sends an operations part operation report to the detection distance determining-computing part 112 (step S23).

The detection distance determining-computing part 112 that has received the operations part operation report acquires current date and time (step S24), and saves a set of information "operations part operation: current date and time" to the history information 114 (step S25). Note that operation information is not saved every time an operation is performed; only the first operation information after information on the presence of the person is saved is saved in the history information 114.

Next, in FIG. 7, when a user departs (exits) from the detection area of the human body detector 107, the human body detector 107 detects the person's leaving from the image forming apparatus 1, and transmits a leaving report to the electric energy controller 111 (step S31). The electric energy controller 111 sends a leaving report to the detection distance determining-computing part 112 (step S32).

The detection distance determining-computing part 112 that has received the leaving report acquires current date and time (step S33), and saves a set of information "absence of a person: current date and time" to the history information 114 (step S34).

In FIG. 7, the following process of steps is executed every predetermined period. The predetermined period may, for example, be a day, a week, etc., indicating a period during which a certain number of history information sets are collected.

In step S41, the detection distance determining-computing part 112 acquires history information 114, and subsequently acquires a current detection distance of the apparatus-specific information 113 and restoration time (steps S42 and S43).

The detection distance determining-computing part 112 subsequently determines whether to change the detection distance of the human body detector 107, and re-computes, when determined to change the detection distance of the human body detector 107, the detection distance (step S44). Details of the process will be described later.

When the detection distance determining-computing part 112 re-computes the detection distance, the detection distance determining-computing part 112 subsequently requests the sensor adjusting part 115 to set (rewrite) the detection distance (step S45). The sensor adjusting part 115 that has received the above request sets the detection distance in the human body detector 107 (step S46).

The detection distance of the human body detector 107 may be changed based on the following factors.

A voltage threshold for determining approach or leaving of a person

A physical arrangement angle of a sensor (downward or upward angle)

The amount covering the surface of the sensor

Corresponding relationships between the detection distance and respective values of the above factors are known in advance. Hence, the detection distance may be set in the human body detector 107 by allowing the sensor adjusting part 115 to specify the detection distance and allowing the human body detector 107 to convert the specified detection distance into a control value. Alternatively, the detection distance may be set in the human body detector 107 by allowing the sensor adjusting part 115 to convert the detection distance into the control value.

The detection distance determining-computing part 112 subsequently saves the current detection distance into the apparatus-specific information 113 (step S47).

Figure 8:
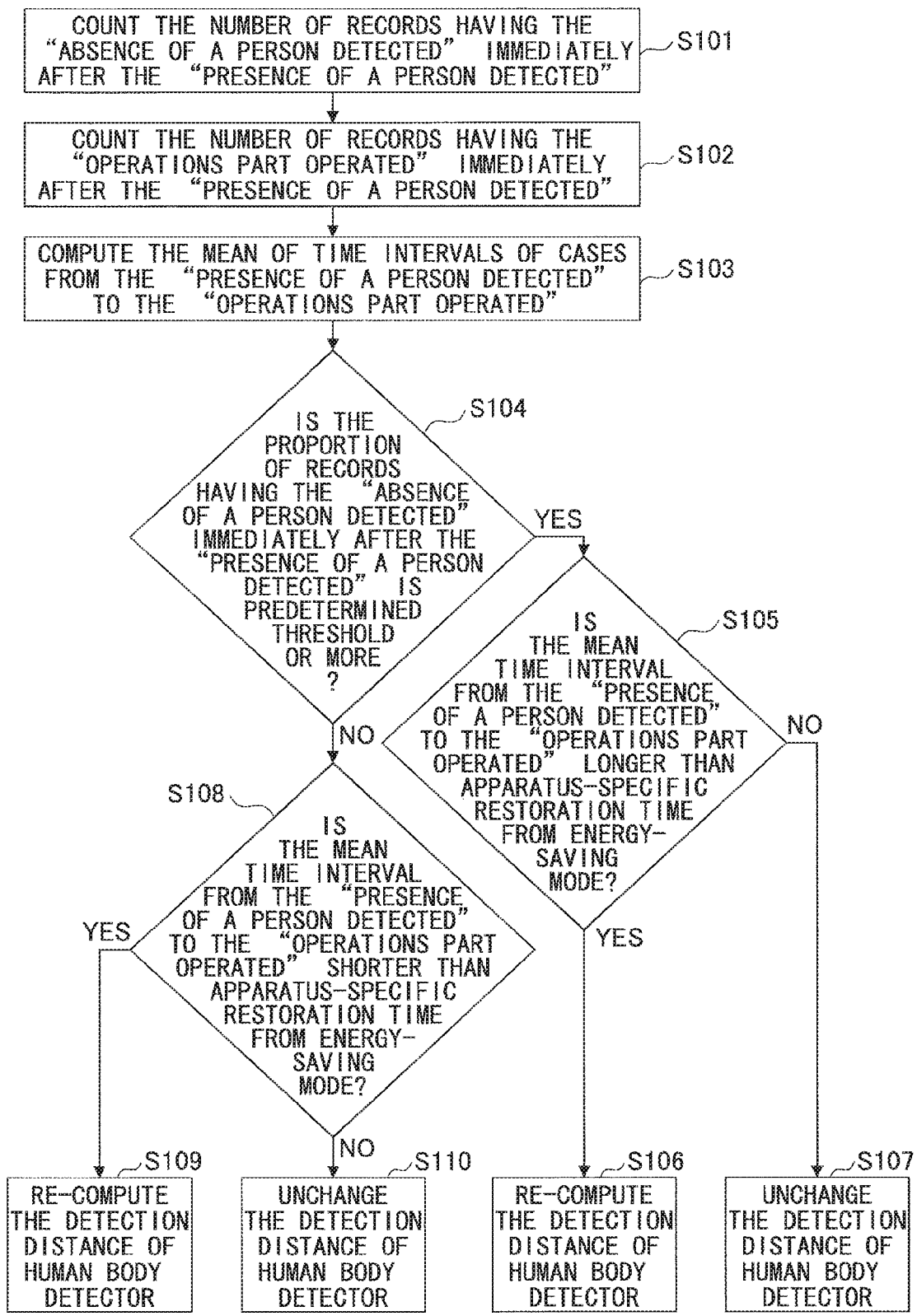
FIG. 8 is a flowchart illustrating a process example of determining and re-computing a detection distance in the first embodiment.

FIG. 8 is a flowchart illustrating a process example of determining-recomputing the detection distance (step S44 in FIG. 7) performed by the detection distance determining-computing part 112 according to the first embodiment. In FIG. 8, the detection distance determining-computing part 112 counts the number of records having "absence of a person detected" immediately after the "presence of a person detected" from the history information 114 (step S101). There are three records of the above case in the history information 114 in FIG. 5, namely, the records indicated by the serial number 5 immediately after the serial number 4, the serial number 7 immediately after the serial number 6, and the serial number 9 immediately after the serial number 8.

Referring back to FIG. 8, the detection distance determining-computing part 112 subsequently counts the number of records having the "operations part operated" immediately after the "presence of a person detected" from the history information 114 (step S102). There are three records of the above case in example of the history information 114 in FIG. 5, namely, the records indicated by the serial number 2 immediately after the serial number 1, the serial number 11 immediately after the serial number 10, and the serial number 14 immediately after the serial number 13.

Referring back to FIG. 8, the detection distance determining-computing part 112 subsequently computes a mean of time intervals from the "presence of a person detected" to the "operations part operated" from the history information 114 (step S103). In the example of the history information 114 in FIG. 5, 3 s is computed as the mean value of (1) 3 s from the serial number 1 to the serial number 2, (2) 5 s from the serial number 10 to the serial number 11, and (3) 1 s from the serial number 13 to the serial number 14.

Referring back to FIG. 8, the detection distance determining-computing part 112 determines whether the proportion of records having the "absence of a person detected" immediately after the "presence of a person detected" is a predetermined threshold or above (step S104). For example, when the predetermined threshold is 40%, the proportion of records having the "absence of a person detected" immediately after the "presence of a person detected" is 50% (i.e., three times out of six times), which will be determined to be greater than the predetermined threshold.

Referring back to FIG. 8, when the proportion of records having the "absence of a person detected" immediately after the "presence of a person detected" is the predetermined threshold or above (YES in step S104), this indicates inefficient restoration from the energy-saving mode, which may anticipate a longer detection distance of the human body detector 107.

In this case, the detection distance determining-computing part 112 further determines whether the mean of the time intervals from the "presence of a person detected" to the "operations part operated" exceeds the restoration time from the energy-saving mode in the apparatus-specific information 113 (step S105). For example, when the restoration time from the energy-saving mode is 1.5 s, the mean time interval is 3 s in the history information 114 in FIG. 5, which may be determined to be longer than the restoration time from the energy-saving mode.

Referring back to FIG. 8, when the mean time interval from the "presence of a person detected" to the "operations part operated" is determined to be longer than the restoration time from the energy-saving mode (YES in step S105), a person who is undesired to use the image forming apparatus 1 is erroneously detected, indicating that the image forming apparatus 1 has been restored from the energy-saving mode quicker than expected. Hence, the detection distance of the human body detector 107 may be reduced. The detection distance determining-computing part 112 re-computes the detection distance of the human body detector 107 accordingly (step S106).

The computation formula of the detection distance may be as follows.

$$\text{New detection distance} = \text{Current detection distance} / \text{Mean time from the ``presence of a person detected'' to the ``operations part operated''} \times \text{Apparatus-specific restoration time from energy-saving mode}$$

When the formula is applied to the example of the history information 114 in FIG. 5, the new detection distance is computed by "the current detection distance×1.5/3", which obtains a value indicating a detection distance shorter than the current detection distance.

Referring back to FIG. 8, when the mean time interval from the "presence of a person detected" to the "operations part operated" is determined not to be longer than the restoration time from the energy-saving mode in the apparatus-specific information 113 (NO in step S105), the image forming apparatus 1 has not been restored from the energy-saving mode quicker than expected. Hence, the detection distance of the human body detector 107 is unchanged (step S107).

On the other hand, when the proportion of records having the "absence of a person detected" immediately after the "presence of a person detected" is determined not to be the predetermined threshold or more (i.e., determined to be less than the predetermined threshold) (NO in step S104), the detection distance may be too short.

In this case, the detection distance determining-computing part 112 further determines whether the mean of the time intervals from the "presence of a person detected" to the "operations part operated" is shorter than the restoration time from the energy-saving mode in the apparatus-specific information 113 (step S108).

When the mean of the time intervals from the "presence of a person detected" to the "operations part operated" is determined to be shorter than the restoration time from the energy-saving mode in the apparatus-specific information 113 (YES in step S108), a person who is undesired to use the image forming apparatus 1 is not erroneously detected, and walking velocity of a user who is desired to use the image forming apparatus 1 is higher than expected, indicating that the user who is desired to use the image forming apparatus 1 may be kept waiting. Hence, the detection distance of the human body detector 107 may be increased. The detection distance determining-computing part 112 re-computes the detection distance of the human body detector 107 accordingly (step S109). The computation formula is the same as that presented above.

When the mean time interval from the "presence of a person detected" to the "operations part operated" is determined not to be longer than the restoration time from the energy-saving mode in the apparatus-specific information 113 (NO in step S108), the user is not necessarily kept waiting. Hence, the detection distance of the human body detector 107 is unchanged (step S110).

Modification 1

The modification 1 excludes specific data (specific records) exceeding the predetermined threshold from the counted and the computed results of the process example of FIG. 8 having "counting the number of records having the absence of a person detected immediately after the presence of a person detected" (step S101), "counting the number of records having the operations part operated after the presence of a person detected" (step S103), and "computing the mean of the time intervals from the presence of a person detected to the operations part operated" (step S103). Excluding the specific data may prevent the computation results from including the errors due to the specific operations performed by the user, which may improve the accuracy in re-computation of the detection distance.

For example, a user is determined to be within a range of the detection distance of the image forming apparatus 1 when the time interval between the absence of a person detected and the presence of a person detected is 10 min. or more while the absence of a person detected is sequentially saved after the presence of a person detected (the "presence of a person detected"→the "absence of a person detected"), and this record is excluded from the counted results. Further, a user is determined to approach the image forming apparatus 1 from a blind spot of the detection area of the human body detector 107 (e.g., behind the image forming apparatus 1) when the time interval between the operations part operated and the presence of a person detected is within 1 s while the operations part operated is sequentially saved after the presence of a person detected (the "presence of a person detected"→the "operations part operated"), and hence, this record is excluded from the counted results.

According to these exclusion examples, a case of the serial number 7 after the serial number 6 that corresponds to the first exclusion example is subject to being excluded from the counts in the history information 114 of FIG. 5. Hence, the total number of records having the absence of a person detected after the presence of a person detected may be two. Further, a case of the serial number 14 after the serial number 13 that corresponds to the second exclusion example is subject to being excluded from the counts. Hence, the total number of records having the operations part operated after the presence of a person detected may be two. Moreover, the mean interval time is 4 s, which is computed based on "3 s" from the serial number 1 to the serial number 2 and "5 s" from the serial number 10 to the serial number 11.

Modification 2

The modification 2 introduces a coefficient in "re-computing the detection distance of the human body detector 107" (steps S106, and S109) of the process example of FIG. 8 to change the coefficient based on wideness information of the detection area, which is made selectable by the user. The modification 2 thus enables each of the users to set a desired detection area. For example, a user who desires to prevent inefficient restoration from the energy-saving mode may set the detection area to be narrower whereas a user who desires to use immediately after restoration of the image forming apparatus 1 from the energy-saving mode, regardless of the inefficient restoration from the energy-saving mode may set the detection area to be wider.

Figure 9:
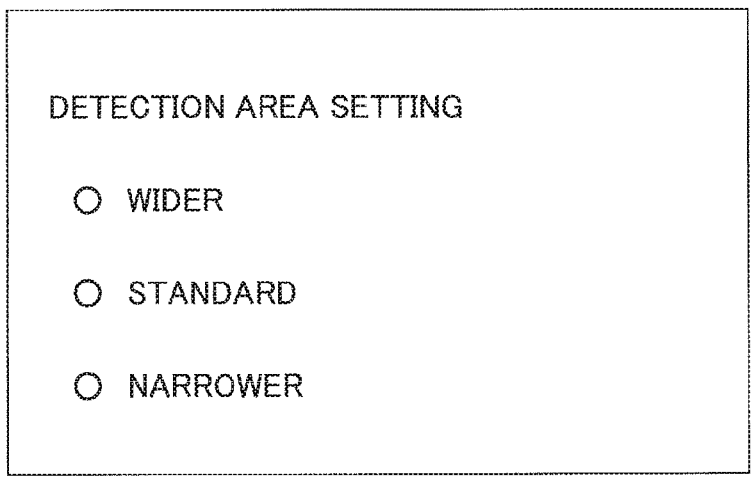
FIG. 9 is a diagram illustrating an example of a user interface for setting a detection area in a second modification.

FIG. 9 is a diagram illustrating an example of a user interface for setting a detection area in the second modification. The example of a detection area setting screen enables a user to select radio buttons in association with three options of "wider", "standard", and "narrower" detection areas. In this example, the coefficient $\alpha$ employs 1.2 when the user selects the "wider" option, the coefficient $\alpha$ employs 1.0 when the user selects the "standard" option, and the coefficient $\alpha$ employs 0.8 when the user selects the "narrower" option.

The computation formula of the detection distance may be as follows.

New detection distance=Current detection distance/
Mean time from the "presence of a person detected" to the "operations part operated"×
Apparatus-specific restoration time from energy-saving mode×Coefficient $\alpha$ Modification 3

The modification 3 includes a setting for not storing information in a time period set in advance in the history information 114 illustrated in FIG. 5, among operations history information stored in the history information 114. For example, the modification 3 includes a setting for not storing information in a time period from 11:00 to 11:30 every day. With this setting being applied, information of the serial numbers 8 to 12 are not stored in the history information 114 of FIG. 5. Thus, the modification 3 may change a re-computational result of the detection area of the human body detector 107.

The modification 3 may improve the accuracy of re-computing the detection area because the modification 3 does not require computing of primarily unnecessary information in a certain time period (e.g., lunch time), where the image forming apparatus 1 is unused.

Figure 10:
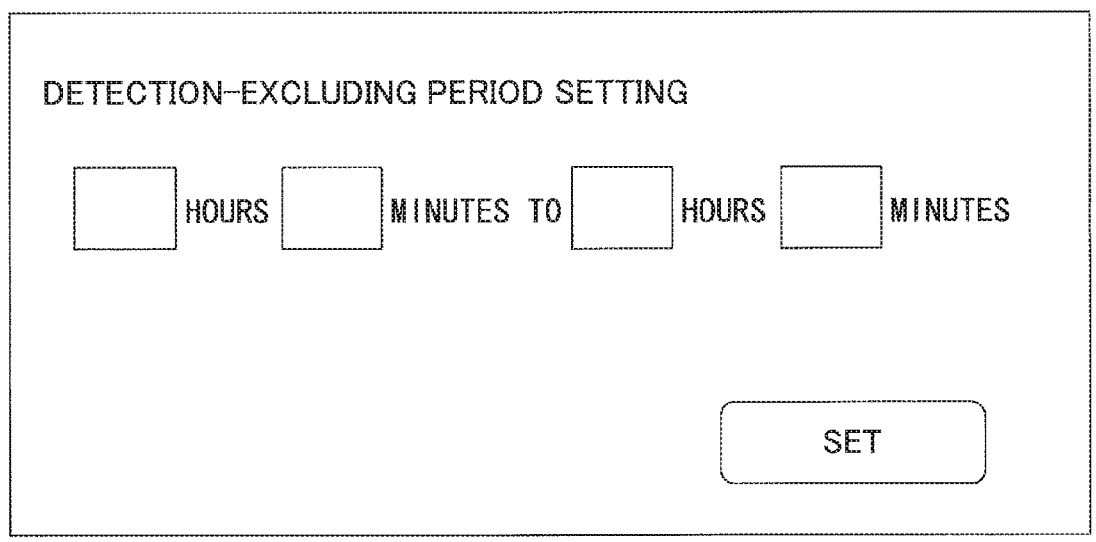
FIG. 10 is a diagram illustrating an example of a user interface for setting a detection excluding period in a third modification.

FIG. 10 is a diagram illustrating an example of a user interface for setting a detection excluding period in the third modification. The users or administrators may input a start time and an end time of the detection excluding period, and subsequently select a "SET" button in the detection excluding setting screen illustrated in FIG. 10 in order to set the detection excluding period for not storing operations history in the history information 114.

Modification 4

The modification 4 enables the user or administrators to change the "apparatus-specific restoration time from the energy-saving mode" that is used to re-compute a new detection distance of the human body detector 107. For example, the modification 4 enables the user or administrators to select one of the options, namely the "apparatus to be ready to start scanning" and the "operations panel to be ready for use", as the "apparatus-specific restoration time from the energy-saving mode"

In general, the image forming apparatus 1 may require a different time in being restored from the energy-saving mode in accordance with the user's requests. For example, when the image forming apparatus 1 restores from the energy-saving mode, the time required for the operations part to be ready for use may differ from the time required for the image forming apparatus 1 to be ready to scan (read) a document.

Further, different users use the image forming apparatus 1 differently after the image forming apparatus 1 is restored from the energy-saving mode. That is, some users may use the image forming apparatus 1 for scanning a document with default settings whereas other users may use the image forming apparatus 1 for scanning a document after changing the settings.

For example, the users who use the image forming apparatus 1 for scanning a document with default settings may desire the "apparatus-specific restoration time from the energy-saving mode" to be the time for allowing the image forming apparatus 1 to be ready to start scanning a document after being restored from the energy-saving mode. On the other hand, the users who use the image forming apparatus 1 for scanning a document after changing the settings may desire the "apparatus-specific restoration time from the energy-saving mode" to be the time for allowing the operations part 11 to be ready to be operable (ready for use) after being restored from the energy-saving mode.

The modification 4 may thus allow the users to change the "apparatus-specific restoration time from the energy-saving mode" according to the users different requests.

Figure 11:
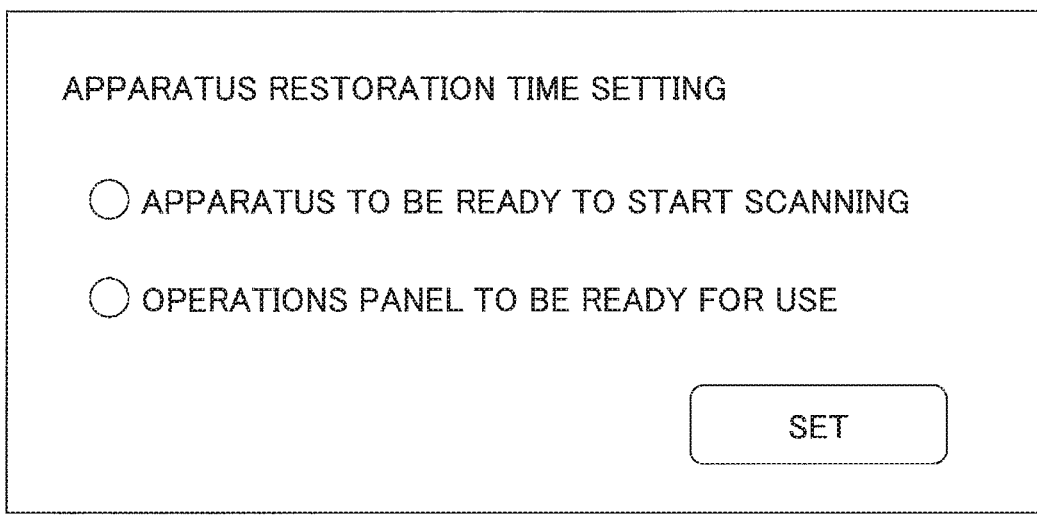
FIG. 11 is a diagram illustrating an example of a user interface for setting a restoration time in a fourth modification.

FIG. 11 is a diagram illustrating an example of a user interface for setting an apparatus restoration time in the modification 4. The users or administrators may select options for the "apparatus-specific restoration time from the energy-saving mode" by selecting one of optional buttons through a setting screen for the apparatus restoration time setting to change the setting of the "apparatus-specific restoration time from the energy-saving mode".

Outline

The above-described embodiments and modifications may set an appropriate detection distance of the human body detector 107 to improve both the energy-saving performance and the usability of the image forming apparatus.

The preferred embodiments are described above. In the above embodiments and modifications, the present invention is illustrated with specific examples; however, the present invention is not limited to these examples, and various alterations or changes may be made without departing from the gist and the scope of the claims of the present invention. Specifically, the present invention shall not be construed as being limited to details of the specific examples and accompanying drawings thereof.

Correspondence Between Terms in the Embodiments and Terms in the Claims

The operations parts 11 and 106 indicate examples of an "operations detector". The human body detector 107 is an example of a "moving body detector". The electric energy controller 111 is an example of a status controller. The detection distance determining-computing part 112 is an example of a "computing part". The sensor adjusting part 115 is an example of a "setting part".

Second Embodiment

The configurations of the image forming apparatus 1 according to the first The embodiment illustrated in FIGS. 2 and 4 are only examples; various other configurations may be made according to different purposes or application. The second embodiment illustrates a different configuration example of the image forming apparatus 1.

Hardware Configuration

Figure 12:
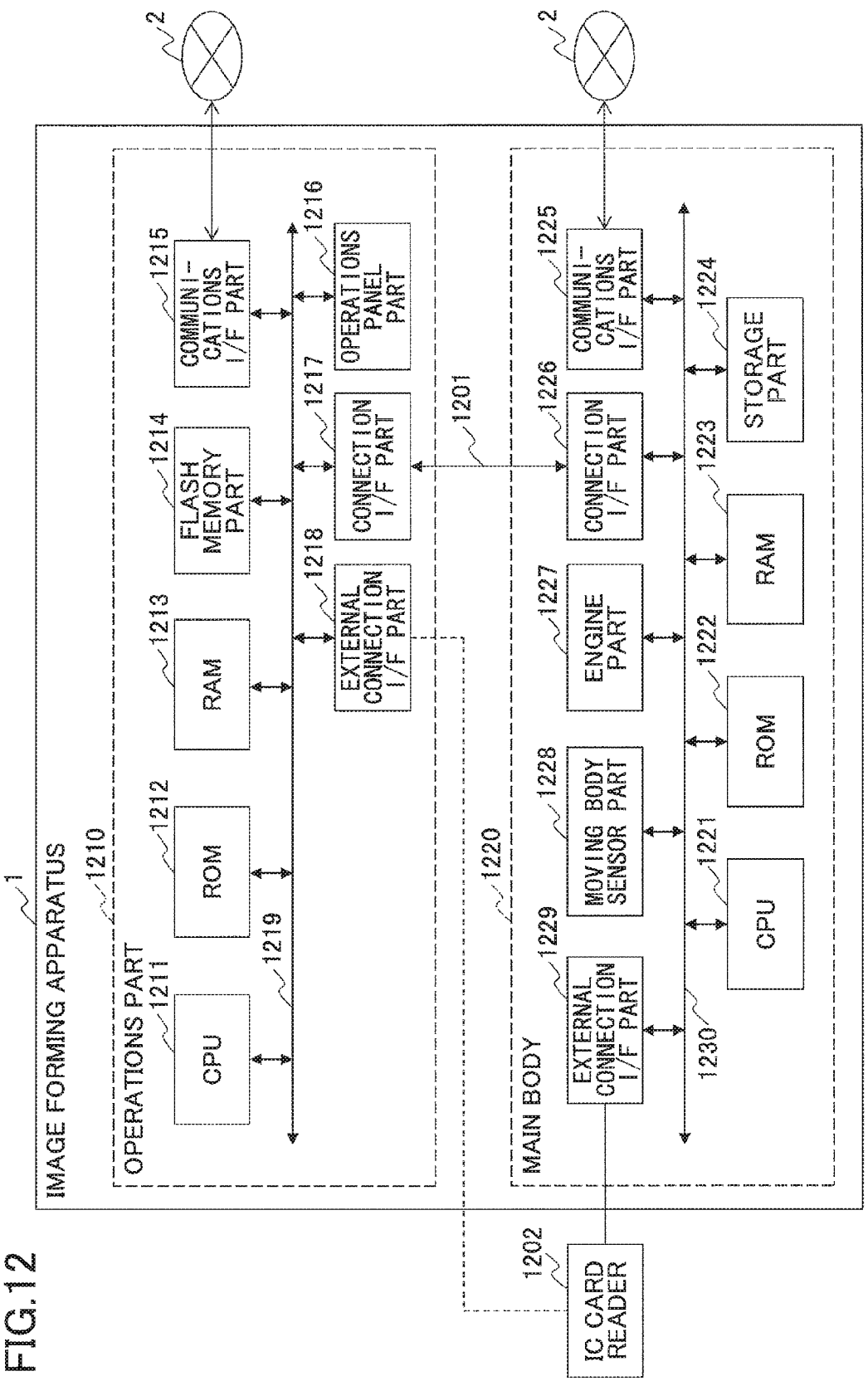
FIG. 12 is a diagram illustrating a hardware configuration example of an image forming apparatus according to a second embodiment.

FIG. 12 is a diagram illustrating a hardware configuration example of the image forming apparatus 1 according to the second embodiment. The image forming apparatus (information processing apparatus) 1 may, for example, include a main body 1220 configured to implement various types of image forming functions such as a copier function, a scanner function, a facsimile function, and a printer function, and an operations part 1210 configured to receive user's operations. The main body 1220 and the operations part 1210 are inter-communicably coupled via a dedicated communications channel 1201. The communications channel 1201 may employ one of the universal serial bus (USB) standards; however, any standards may be used for the communications channel 1201 regardless of wired or wireless ones.

Note that main body 1220 may exhibit processing in accordance with operations received by the operations part 1210. The main body 1220 may be able to communicate with external apparatuses such as client personal computers (PCs), and may exhibit processing in accordance with instructions received from the external apparatuses.

Hardware Configuration of Main Body

The following illustrates a hardware configuration of the main body 1220 first. FIG. 12 illustrates the main body 1220 that includes a CPU 1221, a ROM 1222, a RAM 1223, a storage part 1224, a communications I/F part 1225, a connection I/F part 1226, an engine part 1227, a moving body sensor part 1228, an external connection I/F part 1229, and a system bus 1230.

The CPU 1221 is configured to integrally control processing or operations of the main body 1220. The CPU 1221 is configured to control overall operations of the main body 1220 by executing a program stored in the ROM 1222 or the storage part 1224, using the RAM 1223 as a work area. For example, the CPU 1221 may implement various types functions such as a copier function, a scanner function, a facsimile function, and a printer function using the engine part 1227.

The ROM 1222 is a nonvolatile memory storing, for example, a basic input/output system (BIOS) executed at the startup of the main body 1220, or various types of settings. The RAM 1223 may be a volatile memory used as a work area of the CPU 1221. The storage part 1224 is a nonvolatile storage device storing, for example, an OS, application programs, various types of data, and formed, for example, of an HDD or a solid state drive (SDD).

The communications I/F part 1225 is a network interface configured to couple the main body 1220 to a network 2 to allow the main body 1220 to perform communications with external apparatuses coupled to the network 2. The connection I/F part 1226 is an interface configured to allow the main body 1220 to perform communications with the operations part 1210 via the communications channel 1201.

The engine part 1227 is hardware configured to allow the main body 1220 to perform processing excluding general information processing and communications to implement various types of image forming functions such as a copier function, a scanner function, a facsimile function, and a printer function. The engine part 1227 may, for example, include a scanner (an image reader) configured to scan images of a document, a plotter (an image forming part) configured to perform printing on sheet members such as sheets of paper, and a facsimile part configured to perform facsimile communications. The engine part 1227 may also include specific options such as a finisher configured to sort the printed sheet members, and an automatic document feeder (ADF) configured to automatically feed documents.

The moving body sensor part 1228 is configured to detect moving bodies within the detection range in the vicinity of the image forming apparatus 1, and may employ a pyroelectric sensor. The pyroelectric sensor may be a detector configured to detect moving bodies such as a human body using a pyroelectric element configured to detect light such as infrared light according to a pyroelectric effect. Note that the human body detector 107 illustrated in FIG. 2 is an example of the moving body sensor part 1228.

The external connection I/F part 1229 is an interface such as a USB configured to connect the main body 1220 to external apparatuses. The external apparatuses may include an IC card reader 1202 configured to read information from IC cards. FIG. 12 illustrates an example of the main body 1220 including the moving body sensor part 1228. However, the moving body sensor part 1228 may be included in the external connection I/F part 1229 similar to the IC card reader 1202.

The system bus 1230 is connected to the above-described components, and is configured to transmit address signals, data signals, and various types of control signals.

Hardware Configuration of Operations Part

Next, a description is given of a hardware configuration of the operations part 1210. FIG. 12 illustrates the operations part 1210 that includes a CPU 1211, a ROM 1212, a RAM 1213, a flash memory part 1214, a communications I/F part 1215, an operations panel part 1216, a connection I/F part 1217, an external connection I/F part 1218, and a system bus 1219.

The CPU 1211 is configured to integrally control processing the operations part 1210. The CPU 1211 is configured to control overall processing of the operations part 1210 by executing a program stored in the ROM 1212 or the flash memory part 1214, using the RAM 1213 as a work area. For example, the CPU 1211 implements various types of functions such as displaying information (images) in accordance with inputs received from the users.

The ROM 1212 may be a nonvolatile memory storing a basic input/output system (BIOS) executed at the startup of the operations part 1210, or various types of settings. The RAM 1213 may be a volatile memory used as a work area of the CPU 1211. The flash memory part 1214 may be a nonvolatile storage device storing, for example, an OS, application programs, and various types of data.

The communications I/F part 1215 is a network interface configured to couple the operations part 1210 to a network 2 to allow the operations part 1210 to perform communications with external apparatuses coupled to the network 2.

The operations panel part 1216 is configured to receive various types of inputs in accordance with operations of the user, and display various types of information (e.g., information in accordance with the received operations, information indicating operations status of the image forming apparatus 1, and setting statuses). Note that the operations panel part 1216 may be formed of a liquid crystal display installed with a touch panel function; however, the operations panel part 1216 is not limited to this configuration. The operations panel part 1216 may be formed of an organic electro-luminescence (EL) display apparatus installed with a touch panel function. The operations panel part 1216 may additionally or alternatively includes an operation part of hardware keys or a display part such as a lamp.

The connection I/F part 1217 is an interface configured to allow the operations part 1210 to perform communications with the main body 1220 via the communications channel 1201.

The external connection I/F part 1218 is an interface such as a USB configured to connect the operations part 1210 to the external apparatuses. Note that in the example of FIG. 12, the IC card reader 1202 is connected to the external connection I/F part 1229 of the main body 1220; however, the IC card reader 1202 may be connected to the external connection I/F part 1218 of the operations part 1210.

The system bus 1219 is connected to the above-described components, and is configured to transmit address signals, data signals, and various types of control signals.

Figure 13:
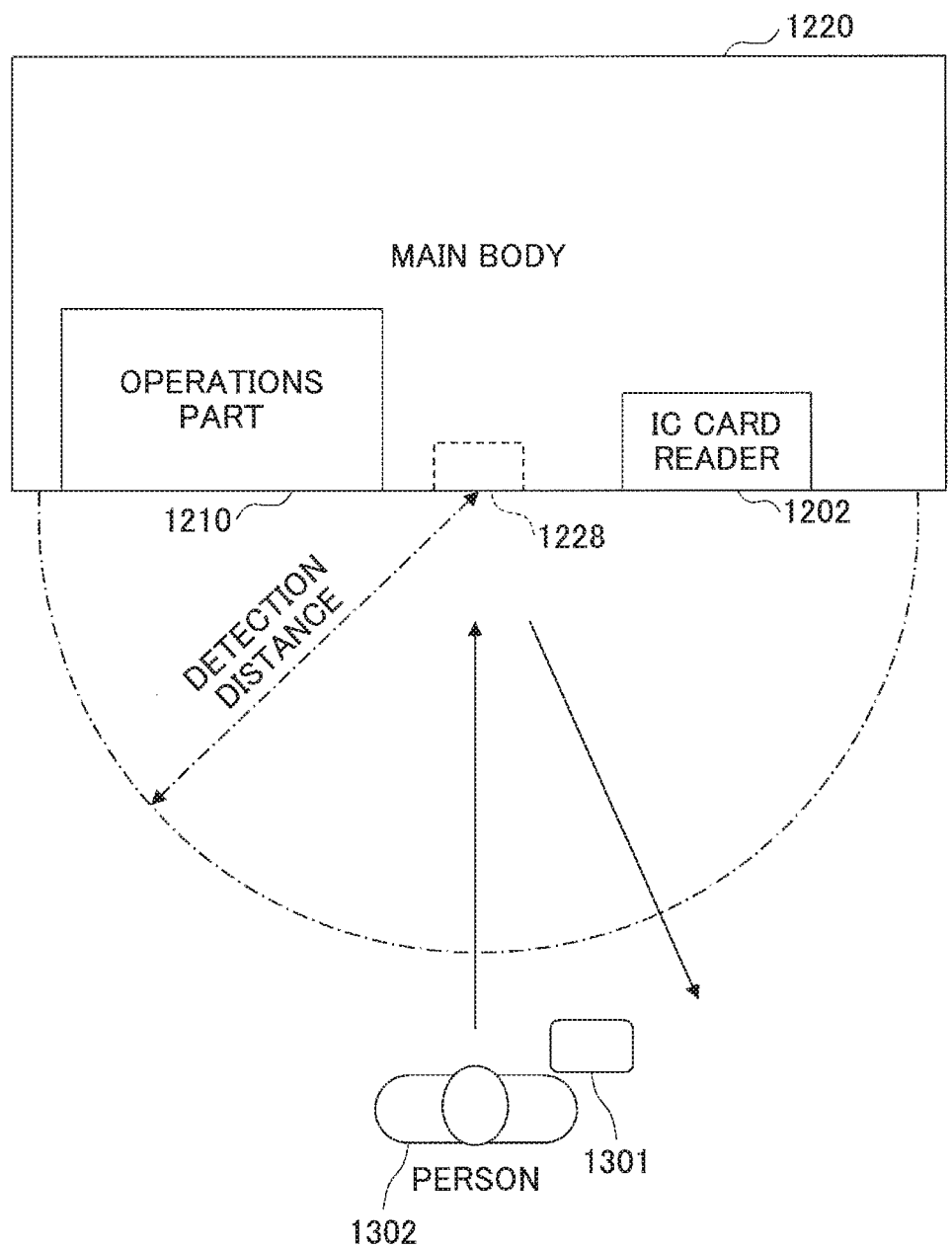
FIG. 13 is a diagram illustrating an example of a moving body detector in a second embodiment that detects a moving body approaching the image forming apparatus or leaving from the image forming apparatus.

FIG. 13 is a diagram illustrating an example of a moving body sensor 1228 according to the second embodiment that detects a moving body approaching the image forming apparatus 1 or leaving from the image forming apparatus 1. FIG. 13 illustrates an example of the moving body sensor part 1228 that is disposed on the main body 1220 of the image forming apparatus 1. The image forming apparatus 1 detects a moving object such as a person that approaches the image forming apparatus 1 at the time of the moving object entering an area having a radius of the detection distance from the position of the moving body sensor part 1228 as the approach of the moving object (presence of person detected). The image forming apparatus 1 detects the moving object that leaves from the image forming apparatus 1 at the time of the moving object departing from the area as the leaving of the moving object from the image forming apparatus 1 (absence of person detected). The detection distance is automatically set such that the image forming apparatus 1 may exhibit advantageous energy-saving performance and usability.

Note that the moving body sensor part 1228 is not limited to being disposed in the main body 1220. The moving body sensor part 1228 may be disposed outside the image forming apparatus 1, or may be disposed in the operations part 1210. The area detected by the 1228 is not limited to a non-directional circle area. The area detected by the moving body sensor part 1228 may have a directional shape.

The image forming apparatus 1 according to the second embodiment includes the IC card reader 1202. The IC card reader 1202 is configured to acquire from the IC card 1301 information (e.g., authentication information) recorded in the IC card 1301. For example, the IC card reader 1202 acquires information from the IC card 1301 that has approached a communications service area (e.g., within 10 cm) through near field communications (NFC). Note that NFC is an example of a communications method available to the IC card reader 1202.

A user 1302 of the image forming apparatus 1 has the IC card 1301 having authentication information recorded, and the user 1302 may be able to perform login authentication by moving the IC card 1301 close to the IC card reader 1202. The user 1302 who has received authorization of the login authentication is allowed to use various functions of the image forming apparatus 1.

Functional Configuration

Figure 14:
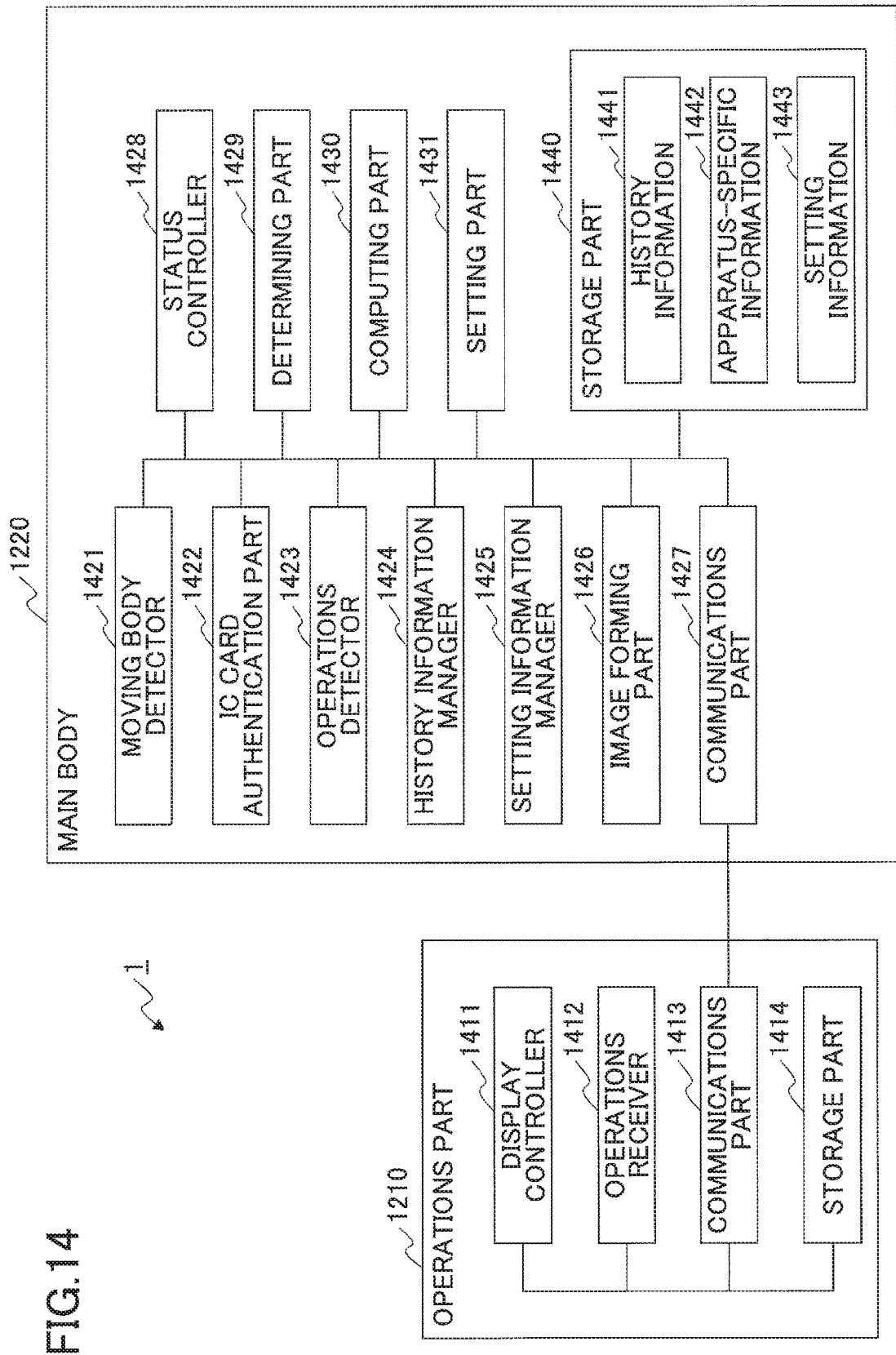
FIG. 14 is a diagram illustrating a functional configuration example of the image forming apparatus according to the second embodiment.

FIG. 14 is a diagram illustrating a functional configuration example of the image forming apparatus 1 according to the second embodiment.

Functional Configuration of Main Body

The main body 1220 includes a moving body detector 1421, an IC card authentication part 1422, an operations detector 1423, a history information manager 1424, a setting information manager 1425, an image forming part 1426, a communications part 1427, a status controller 1428, a determining part 1429, a computing part 1430, a setting part 1431, and a storage part 1440.

The moving body detector 1421 is configured to detect the approach of a moving body (e.g., a user) within a predetermined detection distance range, using such as the moving body sensor part 1228 illustrated in FIG. 12. The moving body detector 1421 is implemented by programs operating, for example, on the moving body sensor part 1228 of FIG. 12 and the CPU 1221 of FIG. 12.

Preferably, the moving body detector 1421 further detects the leaving of the moving body within the predetermined detection range using such as the moving body sensor part 1228.

The moving body detector 1421 may detect the approach or the leaving of the moving body based, for example, on information or signals indicating the presence or absence of the moving body output from the moving body sensor part 1228. Alternatively, the moving body detector 1421 may determine (detect) the approach or the leaving of the moving body based on distance information or coordinate information output from the moving body sensor part 1228.

The IC card authentication part 1422 is configured to authorize the user 1302 to use the image forming apparatus 1 when successfully authenticating the user 1302 by authenticating, using the IC card reader 1202 illustrated in FIG. 12, authentication information read from the IC card 1301 of the user 1302. The IC card authentication part 1422 is implemented by programs operating, for example, on the IC card reader 1202 of FIG. 12 and the CPU 1221 of FIG. 12. The user 1302 may, for example, perform an authentication operation using the IC card 1301 by moving the IC card 1301 close to the IC card reader 1202. Note that this authentication operation is an example of an operation performed by the user 1302 with respect to the image forming apparatus 1.

The operations detector 1423 is configured to detect the operation performed by the user 1302 with respect to the image forming apparatus 1. The electric energy controller 1423 is implemented by a program operating, for example, on the CPU 1221 illustrated in FIG. 12. In the second embodiment, the operations detector 1423 detects, as operations of the user 1302, the input operation with respect to the operations part 1210, or the authentication operation with respect to the IC card authentication part 1422. Note that the above input operation or the authentication operation is merely an example of the operation performed by the user 1302 with respect to the image forming apparatus 1. The operations performed by the user 1302 may also include instructions by voice or gesture, and authentication operations such as fingerprint authentication and authentication by facial recognition.

The history information manager 1424 is configured to store a history of the approach (the presence of a person) or the leaving (the absence of a person) of the moving body detected by the moving body detector 1421 in history information 1441, and manage the history information 1441. The history information manager 1424 further stores a history of the operations of the user 1302 detected by the operations detector 1423 in the history information 1441, and manages the history information 1441. The history information manager 1424 is implemented by a program operating, for example, on the CPU 1221 illustrated in FIG. 12.

FIGS. 15A and 15B are diagrams illustrating examples of history information in the second embodiment.

FIG. 15A indicates an example of the history information 1441 in accordance with the second embodiment. In FIG. 15A, an item noting "moving body detected (presence of moving body)" indicates that the moving body detector 1421 has detected the approach of the moving body, and time and date on the right of the item indicate time and date at which the moving body detector 1421 has detected the approach of the moving body. Further, an item noting "moving body detected (absence of moving body)" indicates that the moving body detector 1421 has detected the leaving of the moving body, and time and date on the right of the item indicate time and date at which the moving body detector 1421 has detected the leaving of the moving body.

Further, an item noting "operation detected" indicates that the operations detector 1423 has detected the operation of the user, and time and date on the right of the item indicate time and date at which the operations detector 1423 has detected the operation of the user. Note that in the example of FIG. 15A, a history of the "operation detected" is stored only once (i.e., only the first operation history is stored) after the "moving body detected (presence of moving body)", in a manner similar to the history information 114 in accordance with the first embodiment illustrated in FIG. 5.

Note that the history information 1441 illustrated in FIG. 15A is merely one of preferred examples, and the history information 1441 may include histories of those other than the histories of "moving body detected (presence of moving body)", "moving body detected (absence of moving body)", and "operation detected".

FIG. 15B indicates an example of the history information 1441 in accordance with the second embodiment. In FIG. 15A, an item noting "electric energy mode switched (operable)" indicates an electricity energy mode of the image forming apparatus 1 is switched to an "operable mode" in which the IC card authentication part 1422 is allowed to perform authentication, and time and date on the right of the item indicate time and date at which the IC card authentication part 1422 is switched to the "operable mode". Further, an item noting "electric energy mode switched (normal)" indicates that the electric energy mode is switched to a "normal mode" in which the image forming apparatus 1 is ready for performing an image forming process, and time and date on the right of the item indicate time and date at which the electric energy mode is switched to the "normal mode". In addition, an item noting "electric energy mode switched (energy-saving)" indicates that the electric energy mode is switched to an "energy-saving mode" in which the image forming apparatus 1 consumes small amount of electric energy, and time and date on the right of the item indicate time and date at which the electric energy mode is switched to the "energy-saving mode".

Moreover, an item noting "operations part operated (setting)" indicates that a user has performed a setting operation on the image forming apparatus 1, and time and date on the right of the item indicate time and date at which the user has performed the setting operation. Likewise, an item noting "operations part operated (scanning)" indicates that a user has performed a scanning operation on the image forming apparatus 1, and time and date on the right of the item indicate time and date at which the user has performed the scanning operation.

Further, an item noting "IC card authenticated (OK)" indicates that authentication of a user (IC card authentication) performed by the image forming apparatus 1 has been successful, and time and date on the right of the item indicate time and date at which the authentication has been succeeded.

Referring back to FIG. 14, the following continues illustration of the functional configuration of the main body 1220.

The setting information manager 1425 is configured to cause the operations part 1210 to display selectable setting screens illustrated in FIGS. 9 to 11, and store the selected settings in setting information 1443 to manage the setting information 1443. The setting information manager 1425 is implemented by a program operating, for example, on the CPU 1221 illustrated in FIG. 12.

The image forming part 1426 is configured to execute various types of image forming functions (e.g., printing, copying, scanning, and facsimile transmission) incorporated in the image forming apparatus 1. The image forming part 1426 is implemented by programs operating, for example, on the engine 105 of FIG. 12 and the CPU 1221 of FIG. 12.

The communications part 1427 serves as a function to perform communications with the operations part 1210, and is implemented by programs operating, for example, on the connection I/F part 1226 of FIG. 12, and the CPU 1221 of FIG. 12.

The status controller 1428 serves as a function to control an electric energy mode of the image forming apparatus 1, and is implemented by a program operating, for example, on the CPU 1221 of FIG. 12. The status controller 1428 may switch an electric energy mode of the image forming apparatus 1 to the "energy-saving mode" in which the image forming apparatus 1 consumes the electric energy less than the electric energy consumed in the "normal mode" in which the image forming apparatus 1 is ready to perform the image forming process. The image forming apparatus 1 in the "energy-saving mode" is capable of lowering the electrical power consumption by deactivating, for example, the operations part 1210, and functions of the engine part 1227, the storage part 1224, and the like illustrated in FIG. 12.

The status controller 1428 in the second embodiment receives a report indicating that the moving body has been detected from the moving body detector 1421 while the image forming apparatus 1 is in the "energy-saving mode", the status controller 1428 restores the image forming apparatus 1 from the energy-saving mode to the normal mode (an example of predetermined electric energy mode).

Alternatively, the status controller 1428 may, upon receiving the detected report of the moving body in the energy-saving mode, switch the energy-saving mode to the operable mode (another example of the predetermined electric energy mode) indicating that the electric energy mode in which the operations part 1210 or the IC card authentication part 1422 is ready for use (ready to be operated by the user). In this case, the status controller 1428 may switch the energy-saving mode of the image forming apparatus 1 to the normal mode after the user (IC card) is authenticated by the IC card authentication part 1422, or the status controller 1428 may switch the energy-saving mode of the image forming apparatus 1 to the normal mode without waiting for the user (IC card) to be authenticated.

The determining part 1429 is configured to determine whether to re-compute the detection distance (predetermined detection distance) for detecting the approach or the leaving of the moving body based on the history information 1441 stored in the storage part 1440. The determining part 1429 is implemented by a program operating, for example, on the CPU 1221 illustrated in FIG. 12. Note that a determining process performed by the determining part 1429 will be described later.

The computing part 1430 is configured to re-compute the detection distance of the moving body detector 1421 based on restoration time indicating the time required for restoring the image forming apparatus 1 set in advance to the predetermined electric energy mode and the history information 1441 stored in the storage part 1440. For example, the computing part 1430 computes the mean time from the detection of the approach of the moving body to the detection of the user's operation, and re-computes the detection distance obtained by the moving body detector 1421 based on the computed mean time and the aforementioned restoration time.

The computing part 1430 may preferably compute the mean time from the detection of the approach of the moving body to the detection of the user's operation by excluding information that satisfies a predetermined condition.

For example, a serial number "4" in the history information 1441 illustrated in FIG. 15A records "moving body detected (presence of moving body)" indicating that the approach of the moving body has been detected. Similarly, a serial number "5" illustrated in FIG. 15A records "moving body detected (absence of moving body)" indicating that the leaving of the moving body has been detected. When the user's operation has not been detected in a period from the approach of the moving body being detected to the leaving of the moving body being detected, the computing part 1430 computes the aforementioned mean time by excluding the record indicating the "moving body detected (presence of moving body)" of the serial number "4". The computation of the meantime similarly excludes a record indicating the "moving body detected (presence of moving body)" of a serial number "12".

Further, no user's operation has been detected between a serial number "9" recording the "moving body detected (presence of moving body)" and a serial number "11" recording the "moving body detected (absence of moving body)" in the history information 1441 as illustrated in FIG. 15B. In this case, the computing part 1430 computes the mean time by excluding the record indicating the "moving body detected (presence of moving body)" of the serial number "9".

In addition, two or more user's operations (serial numbers "5" and "6") have been detected between a serial number "1" recording the "moving body detected (presence of moving body)" and a serial number "7" recording the "moving body detected (absence of moving body)" in the history information 1441 as illustrated in FIG. 15B. In this case, the computing part 1430 computes the mean time by excluding one (serial number "6") of the user's operations (serial numbers "5" and "6").

As illustrated above, despite the history information 1441 including various history information, the computing part 1430 may be able to compute the mean time by excluding information that satisfies the predetermined conditions from the history information 1441 in a manner similar to the case of the history information 1441 of FIG. 15A. Note that the computing part 1430 is implemented by a program operating, for example, on the CPU 1221 illustrated in FIG. 12.

Referring back to FIG. 14, the following continues illustration of the functional configuration of the main body 1220.

The setting part 1431 is configured to set the detection distance re-computed by the computing part 1430 in the moving body detector 1421. This changes the predetermined detection distance, based on which the moving body detector 1421 detects the approach or leaving of the moving body. Note that the setting part 1431 is implemented by a program operating, for example, on the CPU 1221 illustrated in FIG. 12.

The storage part 1440 serves as a function to store the apparatus-specific information 1442, the setting information 1443, and the history information 1441, and is implemented by programs operating, for example, on the storage part 1224 of FIG. 12, and the CPU 1221 of FIG. 12.

FIG. 16A is a table illustrating an example of apparatus-specific information and 16B is a table illustrating an example of setting information in the second embodiment.

The apparatus-specific information 1442 stores information unique to each of the image forming apparatuses 1. FIG. 16A illustrates an example of the apparatus-specific information 1442 storing, for example, "current detection distance (current detection area)", "restoration time to allow operations panel to be ready for use", "restoration time to be ready to start scanning", and "threshold for re-computation".

The "current detection distance" indicates detection distance information set in the moving body detector 1421. The "restoration time to allow operations panel to be ready for use" is information indicating time required for the operations panel to be ready for use since the status controller 1428 has started the restoration process. The "restoration time to be ready to start scanning" is information indicating time required for the image forming apparatus 1 to be ready to start scanning since the status controller 1428 has started the restoration process. Note that the "time to allow operations panel to be ready for use" or the "time to be ready to start scanning" is an example of restoration time required for restoring the image forming apparatus 1 from the energy-saving mode to the predetermined electric energy mode.

The "threshold for re-computation" is a threshold used by the determining part 1429 when the determining part 1429 determines whether to re-compute the detection distance. The determining process performed by the determining part 1429 will be described later.

The setting information 1443 is configured to store information set via the setting screens of FIGS. 9 to 11. FIG. 16B illustrates an example of the setting information 1443 storing the "detection area", "detection excluding period", and "restoration time setting".

The "detection area" stores a setting of the detection area set, for example, via the setting screen of FIG. 9. The "detection excluding period" stores a setting of the detection excluding period set, for example, via the setting screen of FIG. 10. The "restoration time setting" stores a setting of the restoration time of the image forming apparatus 1 set, for example, via the setting screen of FIG. 11.

Functional Configuration of Operations Part

The operations part 1210 includes a display controller 1411, an operations receiver 1412, a communications part communications part 1413, and a storage part 1414.

The display controller 1411 serves as a function to display an operations screen of the image forming apparatus 1 or a setting screen on the operations panel part 1216, and is implemented by a program operating, for example, on the CPU 1221 illustrated in FIG. 12.

The operations receiver 1412 serves as a function to receive a user's operation input in the operations panel part 1216 of FIG. 12, and is implemented by a program operating, for example, on the CPU 1221 illustrated in FIG. 12.

The communications part 1413 serves as a function to perform communications with the main body 1220, and is implemented by programs operating, for example, on the connection I/F part 1217 of FIG. 12, and the CPU 1211 of FIG. 12.

The storage part 1414 serves as a function to store various information, and is implemented by programs operating, for example, on the flash memory part 1214 of FIG. 12, and the CPU 1221 of FIG. 12.

Note that FIG. 14 illustrates only an example of the functional configuration of the image forming apparatus 1 in accordance with the second embodiment. For example, at least part of the history information 1441, the apparatus-specific information 1442, and the setting information 1443 stored in the storage part 1440 of the main body 1220 may be stored in the storage part 1414 of the operations part 1210.

Further, at least part of the components other than the image forming part 1426 and the communications part 1427 included in the main body 1220 of FIG. 14 may be included in the operations part 1210. In this case, each of the components included in the operations part 1210 is implemented by a corresponding one of programs operating, for example, on the CPU 1221 illustrated in FIG. 12.

Process Flow

The following illustrates a process flow of a control method of the image forming apparatus 1.

Re-Computing Process

Figure 17:
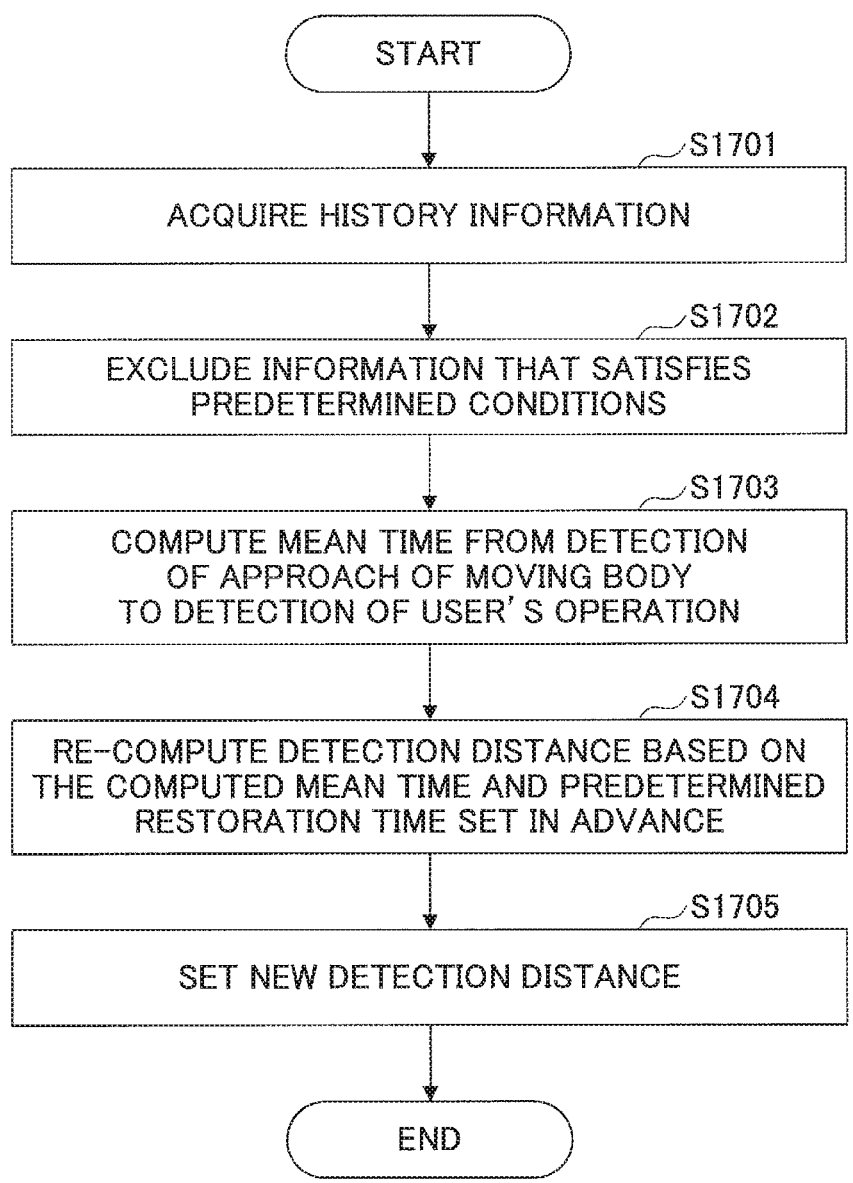
FIG. 17 is a flowchart illustrating a process example of re-computing a detection distance in the second embodiment.

FIG. 17 is a flowchart illustrating a process example of re-computing a detected distance in the second embodiment. The computing part 1430 of the image forming apparatus 1 executes re-computes the detection distance illustrated in FIG. 17 when the determining part 1429 has determined to re-compute the detection distance.

In step S1701, the computing part 1430 of the image forming apparatus 1 acquires history information stored in the storage part 1440.

In step S1701, the computing part 1430 excludes information that satisfies predetermined conditions from the acquired history information 1441.

FIG. 15A illustrates an example of the history information 1441 from which the computing part 1430 excludes the information about the detected result of the moving body when the history information 1441 stores no user's operation between the time at which the approach of that moving body is detected and the time at which the leaving of the moving body is detected. The example of FIG. 15A excludes the information indicating the "moving body detected (presence of moving body)" of the serial number "4", and the "moving body detected (presence of moving body)" of the serial number "12". Note that the "moving body detected (presence of moving body) in the history information 1441 of FIGS. 15A and 15B illustrates that the approach of the moving body has been detected (detection of the moving body approaching the image forming apparatus 1), and the "moving body detected (absence of moving body) in the history information 1441 of FIGS. 15A and 15B illustrates that the leaving of the moving body has been detected (detection of the moving body leaving from the image forming apparatus 1).

FIG. 15B illustrates an example of the history information 1441 from which the computing part 1430 excludes the information such as "switching the electric energy mode", and "executing process", which differ from the information relating to the detected result (approach or leaving) of the moving body, and the user's operation. Further, similar to FIG. 15A, the computing part 1430 excludes the information about the detected result of the moving body from the history information 1441 when the history information 1441 stores no user's operation between the time at which the approach of that moving body is detected and the time at which the leaving of the moving body is detected. Moreover, the computing part 1430 excludes the information about the second onward user's operations from the history information 1441 when the history information 1441 stores two or more user's operations between the time at which the approach of that moving body is detected and the time at which the leaving of the moving body is detected.

The computing part 1430 may preferably exclude specific information that exceeds the predetermined threshold from the information stored in the history information 1441 as illustrated in the above-described modification 1.

In step S1703, the computing part 1430 computes the mean time from the approach of the moving body being detected to the operation of the user being detected.

Note that the example of FIG. 15A illustrates the detection of the approach of the moving body as the "moving body detected (presence of moving body)", and the detection of the user's operation as the "operation detected". For example, the mean time of 3 s (between serial numbers "6" and "7") and 5 s (between serial numbers "9" and "10") is computed to result in 4 s. Note that 3 s is the time taken between the "moving body detected (presence of moving body)" of the serial number "6" and the "operation detected" of the serial number "7", and 5 s is the time taken between the "moving body detected (presence of moving body)" of the serial number "9" and the "operation detected" of the serial number "10".

Note that the example of FIG. 15B illustrates the detection of the approach of the moving body as the "moving body detected (presence of moving body)", and the detection of the user's operation as "IC card authenticated", and "operations part operated".

In step S1704, the computing part 1430 re-computes the detection distance of the moving body detector 1421 based on the computed mean time and the predetermined restoration time.

The computation formula of a new detection distance may be expressed as follows, similar to the first embodiment.

New detection distance=(Current detection distance/Mean time)×Restoration time

The above formula may also be expressed by the following formula.

New detection distance=(Restoration time/Mean time)×Current detection distance

Further, the new detection distance may be expressed by the following formula when the coefficient α in accordance with the modification 2 is used.

New detection distance=(Restoration time/Mean time)×Current detection distance×Coefficient α

Thus, the computing part 1430 re-computes the new detection distance using a ratio of the predetermined restoration time and the mean time computed in step S1703. As a result, when the mean time is longer than the restoration time, the re-computed new detection distance may be short, whereas when the mean time is shorter than the restoration time, the re-compute new detection distance may be long.

The computing part 1430 may further change a value of the coefficient α according to information indicating size (wideness/narrowness) of the predetermined detection area such as information "wider", "standard", and "narrower" set via the setting screen of FIG. 9. For example, when the "wider" is selected in the setting screen of the detection area of FIG. 9, the value of the coefficient α is changed to a value greater than "1.0" such as "1.2". Similarly, when the "narrower" is selected in the setting screen of the detection area of FIG. 9, the value of the coefficient α is changed to a value less than "1.0" such as "0.8".

Note that the example of FIG. 16B indicates the restoration time setting of the setting information 1443 being the "operations panel to be ready for use", and the example of FIG. 16A indicates the restoration time to allow the operations panel to be ready for use in the apparatus-specific information 1442 being "1.5 s", and the predetermined restoration time set in advance is 1.5 s.

In step S1705, the setting part 1431 sets the detection distance re-computed in step S1704 in the moving body detector 1421. The moving body detector 1421 may detect the approach or the leaving of the moving body within a range of the new detection distance re-compute in step S1704.

Determining Process of Re-Computation

Figure 18:
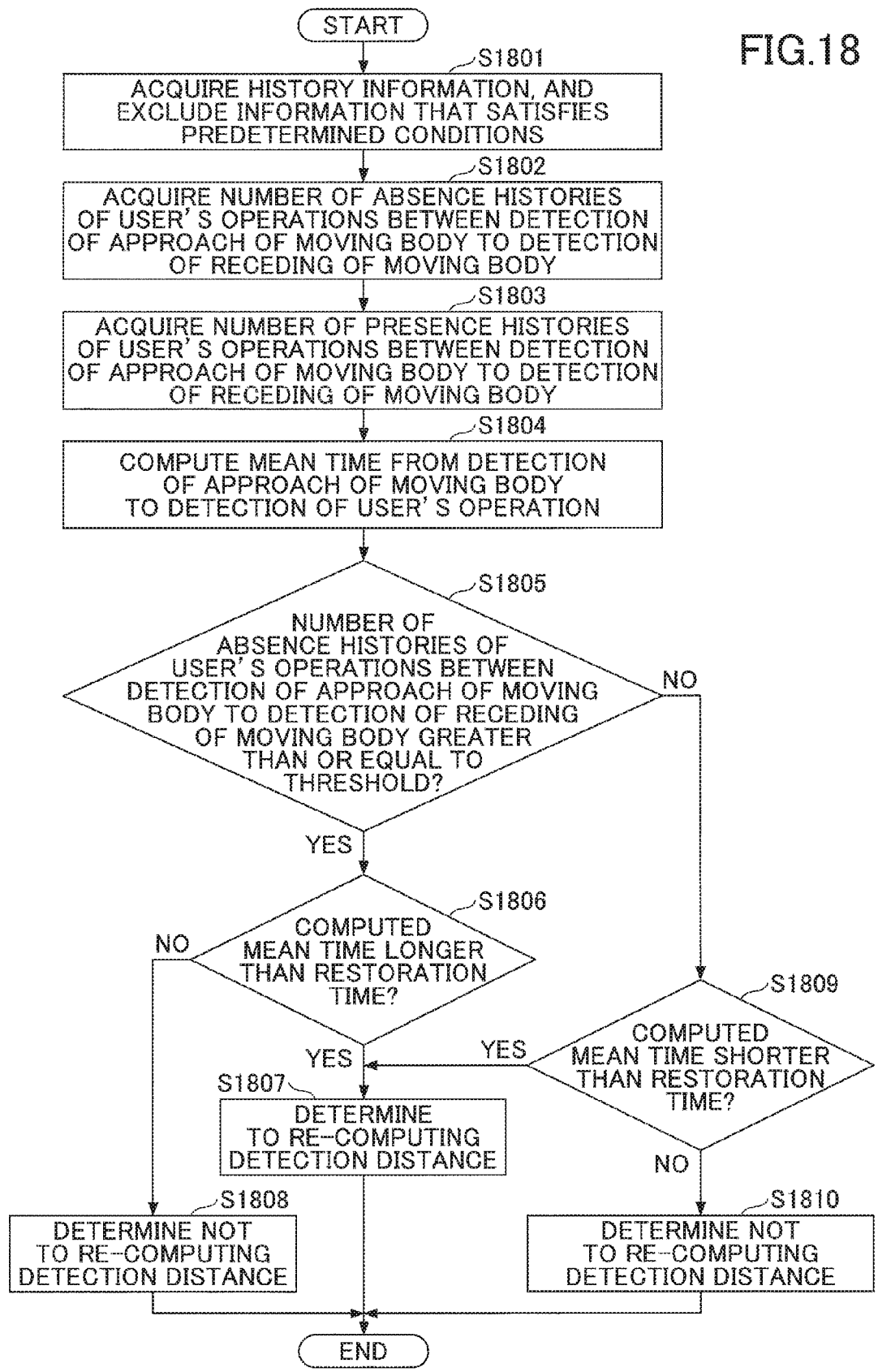
FIG. 18 is a flowchart illustrating an example of a determining process in the second embodiment.

The determining part 1429 may, for example, execute a determination process illustrated in FIG. 18 every predetermined period (e.g., per day, and per week), or may execute the determination process illustrated in FIG. 18 by operations of an administrator to determine whether to re-compute the detection distance.

In step S1801, the determining part 1429 of the image forming apparatus 1 acquires the history information 1441 stored in the storage part 1440, and optionally excludes the information that satisfies the predetermined conditions. The determining part 1429 may, for example, exclude specific information that exceeds the predetermined threshold from the information stored in the history information 1441 as illustrated in the above-described modification 1.

In step S1802, the determining part 1429 acquires the number of no user's operations between the detection of the approach of the moving body and the next detection of the leaving of the moving body.

In step S1803, the determining part 1429 acquires the number of user's operations between the detection of the approach of the moving body and the next detection of the leaving of the moving body.

The example of the history information 1441 of FIG. 15A does not include the "operation detected" between the "moving body detected (presence of moving body)" of the serial number "4" and "moving body detected (absence of moving body)" of the serial number "5". Similarly, the example of the history information 1441 of FIG. 15A does not include the "operation detected" between the serial number "12" and the serial number "13". Thus, the number of no user's operations between the detection of the approach of the moving body and the next detection of the leaving of the moving body is two.

Further, the example of the history information 1441 of FIG. 15A includes the "operation detected" of the serial number "2" between the "moving body detected (presence of moving body)" of the serial number "1" and the "operation detected" of the serial number "3". Similarly, the example of the history information 1441 of FIG. 15A includes the "operation detected" between the serial number "6" and the serial number "8", and between the serial number "9" and the serial number "11". Thus, the number of user's operations between the detection of the approach of the moving body and the next detection of the leaving of the moving body is three.

In step S804, the computing part 1430 computes the mean time from the approach of the moving body being detected to the operation of the user being detected. This process is similar to those of steps S1702 and S1703 of FIG. 17.

In step S1805, the determining part 1429 determines whether the number of no user's operations between the detection of the approach of the moving body and the next detection of the leaving of the moving body is greater than or equal to the re-computed threshold (40% in the example of FIGS. 16A and 16B) of the apparatus-specific information 1442.

When the number of no user's operations between the detection of the approach of the moving body and the next detection of the leaving of the moving body is greater than or equal to the re-computed threshold, the determining part 1429 switches the process to step S1806. On the other hand, when the number of no user's operations between the detection of the approach of the moving body and the next detection of the leaving of the moving body is less than the re-computed threshold, the determining part 1429 switches the process to step S1809.

Switching to step S1826, the determining part 1429 determines whether the mean time computed in step S1804 is longer than the predetermined restoration time (1.5 s in the example of FIGS. 16A and 16B). When the computed mean time is longer than the predetermined restoration time, the determining part 1429 determines to re-compute the detection distance in step S1807. When the computed mean time is not longer than the predetermined restoration time, the determining part 1429 determines not to re-compute the detection distance in step S1807.

Switching to step S1809, the determining part 1429 determines whether the mean time computed in step S1804 is shorter than the predetermined restoration time (1.5 s in the example of FIGS. 16A and 16B). When the computed mean time is shorter than the predetermined restoration time, the determining part 1429 determines to re-compute the detection distance in step S1807. When the computed mean time is not shorter than the predetermined restoration time, the determining part 1429 determines not to re-compute the detection distance in step S1810.

The determining part 1429 determines to re-compute the detection distance when the proportion of histories not including the user's operation is greater than or equal to the predetermined threshold, and the mean time is longer than the restoration time between the detection of the approach of the moving body and the next detection of the leaving of the moving body. In this case, the detection distance is long, and hence a large number of erroneous detections detecting those (moving bodies) who do not use the image forming apparatus 1 may be obtained, and the restoration from the energy-saving mode to the predetermined electric energy mode for those who use the image forming apparatus 1 may be considered as being too fast (quick). Hence, the detection distance of the moving body detector 1421 may preferably be re-computed to be shorter than the current detection distance.

Moreover, the determining part 1429 determines to re-compute the detection distance when the proportion of histories not including the user's operation is less than the predetermined threshold, and the mean time is shorter than the restoration time between the detection of the approach of the moving body and the next detection of the leaving of the moving body. In this case, erroneous detections of detecting those who do not use the image forming apparatus 1 may be less (small), and the restoration from the energy-saving mode to the predetermined electric energy mode for those who use the image forming apparatus 1 may be considered as being too late. Hence, the detection distance of the moving body detector 1421 may preferably be re-computed to be longer than the current detection distance.

Process of Image Forming Apparatus Image Forming Apparatus

Figure 19:
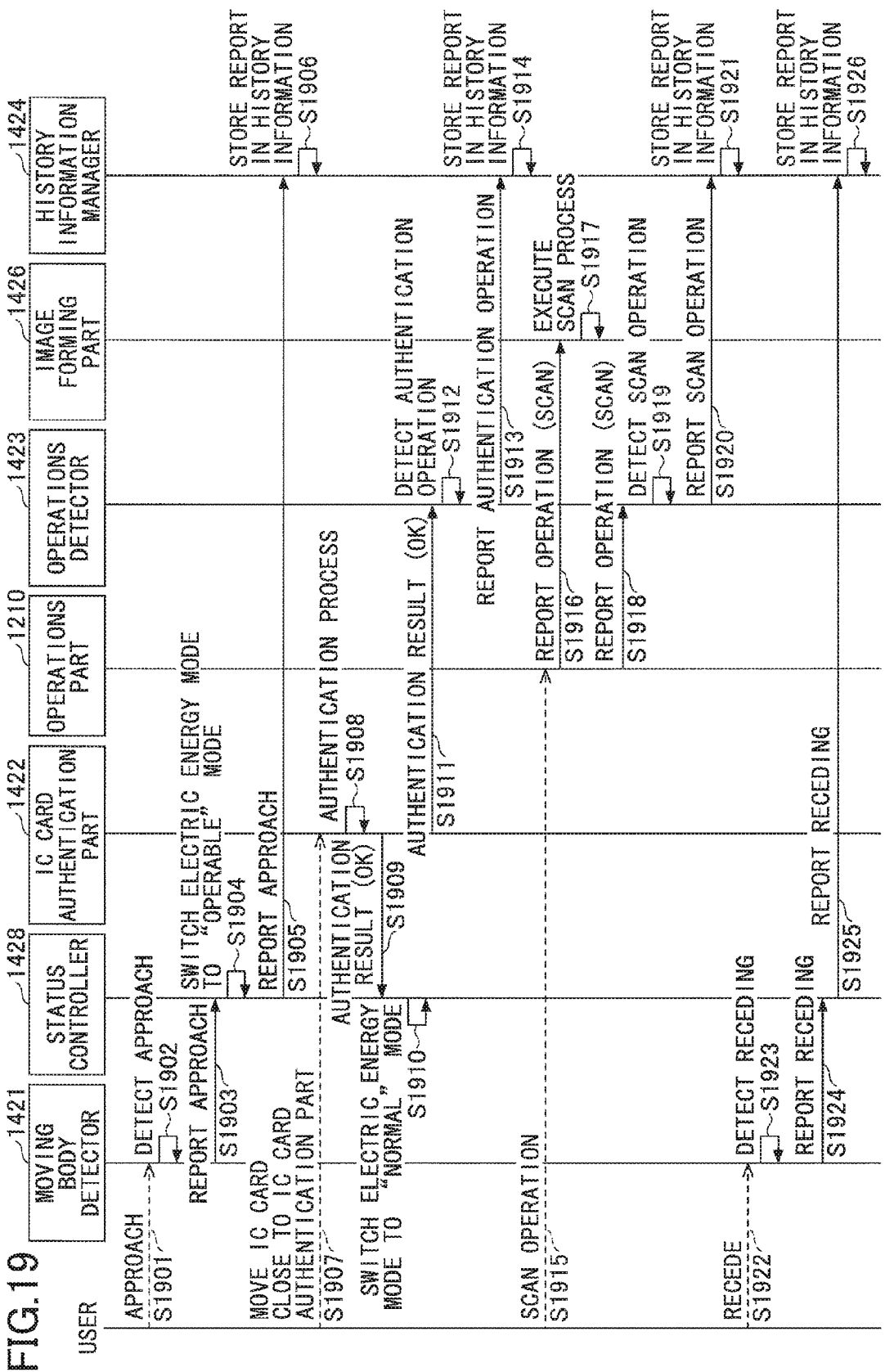
FIG. 19 is a sequence diagram illustrating a process example of the image forming apparatus according to the second embodiment.

FIG. 19 is a sequence diagram illustrating a process example of the image forming apparatus according to the second embodiment. Note that broken lines indicate the user's operations in the sequence diagram of FIG. 19. Note also that the user is assumed to hold (own) the IC card that authorizes the use of the image forming apparatus 1 in the sequence diagram of FIG. 19.

In step S1901, the user approaches a predetermined detection distance range set in the moving body detector 1421 of the image forming apparatus 1, and the moving body detector 1421 of the image forming apparatus 1 detects the approach of the user in step S1902.

In step S1903, the moving body detector 1421 sends a report indicating that the approach of the moving body has been detected to the status controller 1428.

In step S1904, the status controller 1428 switches the electric energy mode of the image forming apparatus 1, for example, to the "operable mode" (an example of a predetermined electric energy mode). the user may be able to use, for example, the operations part 1210 of the image forming apparatus 1, or the IC card reader 1202 as a result.

In step S1905, a report indicating, for example, the approach of the moving body is sent from the status controller 1428 to the history information manager 1424. Note that this report may be sent from the moving body detector 1421 to the history information manager 1424.

In step S1906, the history information manager 1424 stores information indicating that the approach of the moving body has been detected such as "moving body detected (presence of moving body)" presented in FIG. 15B in the history information 1441.

In step S1907, when the user moves the IC card close to the IC card reader 1202 of the image forming apparatus 1, the IC card authentication part 1422 acquires authentication information stored in the IC card to perform an authentication process in step S1908. The following illustrates a case where the authentication of the IC card has been successful.

In step S1909, the IC card authentication part 1422 sends a report indicating a successful authentication result to the status controller 1428.

In step S1910, the status controller 1428 switches the electric energy mode to the "normal mode".

In step S1911, the IC card authentication part 1422 sends a report indicating, for example, a successful authentication result to the operations detector 1423.

In step S1912, the operations detector 1423 detects that the IC card authentication part 1422 has performed authentication.

In step S1913, the operations detector 1423 sends a report indicating that an authentication operation has been performed to the history information manager 1424.

In step S1914, the history information manager 1424 stores information indicating that the authentication operation has been performed such as "IC card authenticated (OK)" presented in FIG. 15B in the history information 1441.

In step S1915, when the user performs a scanning operation with respect to the image forming apparatus 1, the operations part 1210 that has received the scanning operation sends a report indicating that the scanning operation has been received to the image forming part 1426 in step S1916.

In step S1917, the image forming part 1426 executes a scanning process. In this process, the history information manager 1424 may store history information indicating that the scanning process has been executed.

In step S1918, the operations part 1210 may, for example, send a report indicating that the scanning operation has been received to the operations detector 1423.

In step S1919, the operations detector 1423 detects that the scanning operation has been performed.

In step S1920, the operations detector 1423 sends a report indicating that the scanning operation has been performed to the history information manager 1424.

In step S1921, the history information manager 1424 stores information indicating that the scanning operation has been performed such as "operations part operated (scanning)" presented in FIG. 15B in the history information 1441.

In step S1922, when the user leaves from the image forming apparatus 1, the moving body detector 1421 detects the leaving of the user (i.e., the moving body) in step S1923.

In step S1924, the moving body detector 1421 sends a report indicating that the leaving of the moving body has been detected to the status controller 1428. Note that this report may be sent from the moving body detector 1421 to the history information manager 1424.

In step S1925, the status controller 1428 sends a report indicating that the leaving of the moving body has been detected to the history information manager 1424.

In step S1926, the history information manager 1424 stores information indicating that the leaving of the moving body has been detected such as "moving body detected (absence of moving body)" presented in FIG. 15B in the history information 1441.

Note that the process illustrated in FIG. 19 is only an example. The history information manager 1424 may store various history information in the history information 1441 in accordance with the application or the system requirements.

As described above, the image forming apparatus 1 according to the second embodiment includes the operations detector 1423 configured to detect the user's operations, which are not limited to the user's operations performed on the operations part 1210, but may also include various types of the user's operations such as those performed with the IC card reader 1202 or the like. For example, the user's operations detected by the operations detector 1423 may be authentication processes other than the IC card authentication such as fingerprint authentication, or operations performed via operations parts outside the image forming apparatus 1 such as remote controllers or smartphones.

Further, the history information 1441 managed by the history information manager 1424 may include various history information other than histories of the approach and the leaving of the moving bodies, and the history of the first operation.

Supplementary Explanation

The functions of the components illustrated in FIG. 14 are implemented by causing the CPU 1211 or the CPU 1221 illustrated in FIG. 12 to execute the programs stored in storage devices (e.g., the storage part 1224, the flash memory part 1214, the ROM 1222, and the ROM). However, the functions of the components illustrated in FIG. 14 are not necessarily implemented by the above-described manner. At least part of the functions of the components illustrated in FIG. 14 may be implemented by dedicated hardware circuits (e.g., semiconductor integrated circuits).

Further, the programs (control programs) executed in the image forming apparatus 1 may be provided in forms of files having installable formats, or files having executable formats recorded on computer-readable recording media such as various types of disks, media, and USB memories. Alternatively, the programs executed in the image forming apparatus 1 may be provided or distributed via networks such as the Internet. Moreover, various types of programs may be incorporated in advance in nonvolatile recording media such as a ROM or the like.

Other Embodiments

The first and second embodiments have been described by employing the image forming apparatus 1 as an example; however, the embodiments may be applied, other than the image forming apparatus 1, to various types of information processing apparatuses that control the electric energy mode by detecting the user's approach. For example, the embodiments may be applied to various types of information processing apparatuses such as vending machines, automatic teller machines (ATMs), TV conference apparatuses, electronic whiteboards, personal computers (PCs), game machines, and the like.

The technology disclosed above may be capable of improving both the energy-saving performance and the usability of information processing apparatuses.

The present invention is not limited to the specifically disclosed embodiments, and variations and modifications may be made without departing from the scope of the present invention.

The present application is based on and claims the benefit of priority of Japanese Priority Application No. 2015-027291 filed on Feb. 16, 2015, and Japanese Priority Application No. 2016-017131 filed on Feb. 1, 2016, the entire contents of which are hereby incorporated herein by reference.

What is claimed is:

1. An information processing apparatus comprising:
a moving body detector configured to detect approach of a moving body within a range of a first detection distance;
memory storing computer-executable instructions; and
one or more processors configured to execute the computer-executable instructions such that the one or more processors are configured to,
restore, upon detection of the approach of the moving body, the information processing apparatus to a first electric energy mode,
detect an operation of a user,
store, in storage of the information processing apparatus, history information indicating the approach of the moving body and history information indicating the operation of the user,
compute a mean time based on the history information stored in the storage, the mean time being an average of a plurality of approach times, each approach time being a time between a time at which an approach of the moving body is detected and a time at which an operation of the user is detected, and
re-compute the first detection distance based on,
a restoration time required for restoring the information processing apparatus to the first electric energy mode,
the computed mean time, and
the history information stored in the storage, and
set the re-computed first detection distance in the moving body detector,
wherein the one or more processors are configured to execute the computer-executable instructions such that the re-computing of the first detection distance includes,
when a first proportion is greater than or equal to a threshold value, and the mean time is determined to be longer than the restoration time,
reducing the first detection distance in the moving body detector, and
when the first proportion is less than the threshold value, and the mean time is determined to be longer than the restoration time,
increasing the first detection distance in the moving body detector,
the first proportion being a proportion of records, with respect to a plurality of records included in the history information, that are first records,
each first record being a record that indicates an absence of person detected and is preceded by a record that indicates a presence of a person detected.

2. The information processing apparatus according to claim 1, wherein the one or more processors are configured to execute the computer-executable instructions such that the one or more processors are further configured to re-compute the first detection distance based on,
a ratio of the restoration time and the computed mean time, and
a current first detection distance.

3. The information processing apparatus according to claim 1, wherein the one or more processors are configured to execute the computer-executable instructions such that the one or more processors are further configured to compute the mean time by excluding information satisfying a first condition from the history information stored in the storage.

4. The information processing apparatus according to claim 3, wherein the one or more processors are configured to execute the computer-executable instructions such that the one or more processors are further configured to compute the mean time by excluding a specific record from the history information stored in the storage.

5. The information processing apparatus according to claim 1, wherein,
the moving body detector is further configured to detect leaving of the moving body within the range of the first detection distance, and
the one or more processors are configured to execute the computer-executable instructions such that the one or more processors are further configured to,
store, in the storage, history information indicating the leaving of the moving body, and
when the operation of the user is not detected in an interval between the time at which the approach of the moving body is detected and a time at which the leaving of the moving body is detected, compute the mean time by excluding a record indicating that the approach of the moving body is detected, based on the history information stored in the storage.

6. The information processing apparatus according to claim 5, wherein the one or more processors are configured to execute the computer-executable instructions such that the one or more processors are further configured to, when a plurality of the operations of the user are detected in the interval between the time at which the approach of the moving body is detected and the time at which the leaving of the moving body is detected,
compute the mean time by excluding a record indicating that the operation of the user is detected from a second time onward, based on the history information stored in the storage.

7. The information processing apparatus according to claim 5, the one or more processors are configured to execute the computer-executable instructions such that the one or more processors are further configured to a determine whether to re-compute the first detection distance based on the history information stored in the storage.

8. The information processing apparatus according to claim 7, wherein the one or more processors are configured to execute the computer-executable instructions such that the one or more processors are further configured to determine to re-compute the first detection distance when,
a proportion of records not including the user's operation, from among the plurality of records, is greater than or equal to a first threshold, and
the mean time is longer than the restoration time in an interval between a time at which the approach of the moving body is detected and a time at which the leaving of the moving body is detected.

9. The information processing apparatus according to claim 8, wherein the one or more processors are configured to execute the computer-executable instructions such that the one or more processors are further configured to determine to re-compute the first detection distance when,
the proportion of records not including the user's operation, from among the plurality of records, is less than the first threshold, and
the mean time is shorter than the restoration time in the interval between the time at which the approach of the moving body is detected and the time at which the leaving of the moving body is detected.

10. The information processing apparatus according to claim 1, wherein the one or more processors are configured to execute the computer-executable instructions such that the one or more processors are further configured to,
receive an operation of the user, and
detect the operation of the user performed on the Information processing apparatus.

11. The information processing apparatus according to claim 1, further comprising:
a human body detector configured to detect approach and leaving of a person, wherein
the moving body detector is configured to detect the approach of the moving body using the human body detector, and
the one or more processors are configured to execute the computer-executable instructions such that the first detection distance set by the one or more processors is set in the human body detector.

12. The information processing apparatus according to claim 1, wherein the one or more processors are configured to execute the computer-executable instructions such that the one or more processors are further configured to change a coefficient used for re-computing the first detection distance based on information indicating a first size of a detection area.

13. The information processing apparatus according to claim 1, wherein the one or more processors are configured to execute the computer-executable instructions such that the one or more processors are further configured to,
store history information in the storage, and
stop storing the history information in the storage in a first period.

14. The information processing apparatus according to claim 1, further comprising:
a display,
wherein the one or more processors are configured to execute the computer-executable instructions such that the one or more processors are further configured to display, on the display, a selectable setting screen for setting the restoration time.

15. The information processing apparatus according to claim 1, wherein the information processing apparatus is an image forming apparatus.

16. The information processing apparatus of claim 1, wherein the one or more processors are configured to execute the computer-executable instructions such that the re-computing of the first detection distance includes re-computing the first detection distance in accordance with an expression $$R = \frac{C}{M} \times A,$$

where R is the re-computed first detection distance, C is the first detection distance prior to the re-computing, M is the mean time, and A is the restoration time,
the restoration time being an application-specific duration of a process of restoring the information processing apparatus from an energy-saving mode.

17. A non-transitory computer-readable recording medium storing computer-executable instructions that, when executed by one or more processors, cause the one or more processors to perform operations comprising:
controlling a moving body detector to detect an approach of a moving body within a range of a first detection distance;
restoring, upon detection of the approach of the moving body, an information processing apparatus to a first electric energy mode;
detecting an operation of a user;
storing history information indicating the approach of the moving body and history information indicating the operation of the user;
computing a mean time based on the stored history information, the mean time being an average of a plurality of approach times, each approach time being a time between a time at which an approach of the moving body is detected and a time at which an operation of the user is detected;
re-computing the first detection distance based on,
the computed mean time,
a restoration time required for restoring the information processing apparatus to the first electric energy mode, and
the stored history information; and
setting the re-computed first detection distance in the moving body detector,
wherein the re-computing of the first detection distance includes,
when a first proportion is greater than or equal to a threshold value, and the mean time is determined to be longer than the restoration time,
reducing the first detection distance in the moving body detector, and
when the first proportion is less than the threshold value, and the mean time is determined to be longer than the restoration time,
increasing the first detection distance in the moving body detector,
the first proportion being a proportion of records, with respect to a plurality of records included in the history information, that are first records,
each first record being a record that indicates an absence of person detected and is preceded by a record that indicates a presence of a person detected.

18. A method for controlling an electric energy mode of a computer, the method comprising:
detecting, by a moving body detector, an approach of a moving body within a range of a first detection distance;
storing the detected approach of the moving body;
restoring, upon detection of the approach of the moving body, the computer to a first electric energy mode;
detecting an operation of a user;
storing history information including the detected operation of the user;
computing a mean time based on the stored history information, the mean time being an average of a plurality of approach times, each approach time being a time between a time at which an approach of the moving body is detected and a time at which an operation of the user is detected;
re-computing the first detection distance based on,
the computed mean time,
a restoration time required for restoring the computer to the first electric energy mode, and
the stored history information; and
setting the re-computed first detection distance,
wherein the re-computing of the first detection distance includes,
when a first proportion is greater than or equal to a threshold value, and the mean time is determined to be longer than the restoration time,
reducing the first detection distance in the moving body detector, and
when the first proportion is less than the threshold value, and the mean time is determined to be longer than the restoration time,
increasing the first detection distance in the moving body detector,
the first proportion being a proportion of records, with respect to a plurality of records included in the history information, that are first records,
each first record being a record that indicates an absence of person detected and is preceded by a record that indicates a presence of a person detected.

* * * * *